United States Patent [19]

Mittal et al.

[11] Patent Number: 5,629,873

[45] Date of Patent: May 13, 1997

[54] DISTRIBUTED INTELLIGENCE VEHICULAR TIRE AIR PRESSURIZATION SYSTEM AND METHOD

[75] Inventors: Chander P. Mittal, Rowand Heights; Glenn M. Stanley, Azusa, both of Calif.

[73] Assignee: CM Automotive Systems Inc, Walnut, Calif.

[21] Appl. No.: 401,087

[22] Filed: Mar. 8, 1995

[51] Int. Cl.$^6$ .................................................. G01N 11/08
[52] U.S. Cl. .................. 364/558; 364/506; 364/424.045; 152/415; 152/416; 152/417
[58] Field of Search .............................. 364/558, 506, 364/508, 426.02, 424.03, 424.05, 550, 551.01; 152/415–417; 137/224, 224.5, 227–229; 73/146.2–146.5; 141/38, 95, 197; 340/442–444

[56] References Cited

U.S. PATENT DOCUMENTS

| | | | |
|---|---|---|---|
| 4,862,938 | 9/1989 | Mittal | 152/417 |
| 5,309,969 | 5/1994 | Mittal | 152/415 |
| 5,313,995 | 5/1994 | Schultz | 152/416 |
| 5,327,346 | 7/1994 | Goodell | 364/426.02 |

*Primary Examiner*—Edward R. Cosimano
*Assistant Examiner*—Hal D. Wachsman
*Attorney, Agent, or Firm*—Derrick Michael Reid

[57] ABSTRACT

A vehicular tire air pressurization system having an intelligent controller for macro control is connected to one or more intelligent manifolds for micro control so as to distributively process air pressurization functions, with the controller having non volatile memory which is field programmable and alterable for storing current operating conditions, functions and parameters for communicating desired air pressures to the manifolds each connected to at least one set of tires and each including non volatile memory for storing pressurization parameters used to control inflation and deflation of the sets of tires to the desired pressures subject to the pressurization parameters which are also field programmable and alterable and which are updated after periodic pressure adjustment cycles, so that, the tires are efficiently pressurized and maintained at the desired pressures even during changing performance characteristics.

17 Claims, 12 Drawing Sheets

DISTRIBUTED INTELLIGENCE VEHICULAR TIRE AIR PRESSURIZATION SYSTEM AND METHOD

REFERENCE TO RELATED APPLICATION

The present invention is related to U.S. patent application Ser. No. 08/238,251, now U.S. Pat. No. 5,540,268, filed: May 4th 1994, entitled: Improved Method and Apparatus for Repeatable Adjustment of Tire Pressure, and is related to co-pending U.S. patent application Ser. No. 08/401,088, filed: Mar. 8, 1995, and entitled: Improved Vehicular Air Tire Pressurization System and Method.

FIELD OF INVENTION

The present invention relates to pneumatic systems controlling the air pressure in vehicular tires. More particularly, the present invention relates to pressurized control systems and methods using intelligent distributive processing for maintaining proper inflation of vehicular tires.

BACKGROUND OF THE INVENTION

Various types of systems have been used for controllably inflating and deflating vehicle tires during vehicle operation. Such systems typically include an air supply of pressurized air and controls for selectively increasing or decreasing an existing tire pressure, and for determining current tire pressures for each tire. The ability to selectively increase or decrease tire pressure is desirable in connection with optimizing the operation of the vehicle under widely changing conditions including weather, Vehicular load, terrain, and vehicular speed, A wheel valve tire air pressurization system is typically used for heavy vehicles having sets of tires pressurized thought respective manifolds and respective air channels. The wheel valve system has a wheel valve connected to each respective tire. The wheel valve is disposed in the air channel between an axle seal and the tires. The wheel valve can be shut off by air channel evacuation and thereby does not apply a continuous air pressure within the air channel through the axle seals leading to the tires. During the evacuation period when the wheel valve is shut off, the seal is not subject to air pressure. The lack of air pressure tends to extend the life of the axle air seal. The wheel valve system has one or more air manifolds each connected to a respective air channel connected to a respective set of wheel valves each set respectively connected to a set of tires. Each manifold controls the air flow through a respective air channel which controls a set of wheel valves and therefore controls the air pressure in a respective set of tires. Thus, a multiple manifold system can independently control multiple sets of tires, including for example, a set of front steering tires, a set of power drive tires, and a set of rear trailer tires. Each set of tires may have a respective desired tire pressure for a given traveling condition including speed, load and terrain.

The use of multiple manifolds advantageously allows for simultaneous independent air pressurization adjustment of each set of tires, put disadvantageously requires the use of multiple manifolds. The wheel valve system has a cab mounted controller routing a cable of wires to each attached manifold. Thus, in a multiple manifold wheel valve system, there are disadvantageously a plurality of cables extending from the cab mounted controller. There exists a need to reduce the complexity of wheel valve systems. Further, the wheel valve system disadvantageously requires multiple manifolds to independently control the air pressure of multiple sets of tires.

One problem of prior system have included the inability to achieve inflation or deflation from one tire pressure to another with accuracy, and within a reasonable time period. It is desirable to provide a system which is efficient, minimizes operator involvement and obtains the required pressure accuracy within short inflating and deflating time periods. Complex flow control valves or valve orifice arrangements are not very effective to maintain and are undesirably expensive because small orifices tend to clog and are subjected to wear for reasons of high fluid velocities. Successful pressure monitoring systems are described in U.S. Pat. Nos. 4,782,878 and 5,309,969, both here incorporated by reference as there full set forth.

Prior art automatic control systems also suffer from a control problem called "hunting" when attempting to reach a desired tire pressure for a given operating condition.

During a pressure inflation or deflation adjustment cycle, the system will either overshoot or undershoot the desired pressure generating wasteful repeated pressure adjustment cycles, before settling down to a stable pressure. Such systems produce long inflation and deflation times, inaccurate pressure adjustments and reduced reliability of operation. During an adjustment cycle, when dynamic pressure reaches the desired pressure, and the adjustment cycle is terminated, the air pressure may change to a stabilized static pressure which may not equal the desired pressure, which again, may cause the system to enter into another pressure adjustment cycle.

Prior systems also provide methods of eliminating hunting by shutting off the system in the dynamic closed loop operation with the use of pressure offset values to reduce overshooting and undershooting and to provide an a reduction in the inflation and deflation times. One problem associated with the prior system is the loss of pressure offset values when the system is turned off during vehicular parking. Another problem associated with the prior system are errors in the offset values because the offset values do not compensate for the difference between the sensed pressures at the time of terminating the adjustment cycle and the subsequent stabilized static pressure. Yet another problem of the prior offset corrections is the use of constant offset values even during changing operating conditions which require changing offset correction values to maintain system performance.

Prior systems have also failed to address the need to conveniently change system operating functions and parameters especially useful during testing of experimental and newly designed vehicles and tires. Furthermore, air systems have been installed in a plurality of different vehicle models each having respectively desired operating functions and parameters disadvantageously requiring the manufacture of a respective plurality of unique systems or the manufacture of systems with dedicated additional, but unnecessary, model selecting switches.

A continuous air pressurized system is typically used for controlling the tire air pressure in light vehicles through a single manifold and a respective air channel. Continuous pressurized tire systems have been in common use. Kalavitz, U.S. Pat. No. 4,583,566 shows an exemplar continuous pressurized air system. The continuously pressurized system continuously monitors and adjusts the tire pressure with the air channel being continuously pressurized. The continuous system operates a integral three position valve for inflation, deflation and shut off. A transducer continuously monitors the tire air pressure which is compared to a desired pressure and pressure band. When the monitored tire pressure is outside the pressure band about the desired pressure, a valve is actuated to inflate or deflate the tire pressure. Once the pressure falls with the desired pressure band, then the valve is shut off with a resulting continuous air pressure applied within the air channel. The axle seal is used to communicate air pressure from the inflation and deflation valves through the system to the tires. The higher the axle rpm speed under air pressure, the faster the axle seal wears leading to a failure. One problem associated with the continuous pressurized system is the increased wear of the axle seal under continuously pressurized air within an air channel extending through the seal and leading to the tires. Continuous pressurized system is not only pressurized all the time, but also tends to repeatedly fluctuate the air pressure during inflation and deflation cycles to maintain the desired pressure. Pressurized fluctuation of the air channel pressure over time adds further stress to the axle seal which disadvantageously causes premature axle seal wear and resulting failure.

The continuously pressurized system uses a simple error computation method by comparing the actual pressure to the desired pressure band, that difference activating inflation or deflation. The higher the pressure differential between the actual pressure and the desired pressure, the more the system is likely to disadvantageously overshoot the target pressure during inflation or deflation. A small orifice has been used to limit the air flow rates and reduce the time in which the system will reach the desired pressure band to reduce the amount of overshoot and undershoot. However, the smaller the orifice, the more likely the orifice is subject to blockage and failure by debris including rust, dust, dirt, or rubber from the tire, particularly for an orifice under 0.050 inches in diameter. Thus, the continuously pressurized system disadvantageously tends to overshoot or undershoot the target tire pressure, causing additional "hunting", resulting in a plurality of additional deflation or deflation actuations to reach the desired pressure band, and tends to have blocked inflation and deflation orifices, and tends to excessively wear the axle seal. Shole, U.S. Pat. No. 3,878,376 has adapted computer controls in continuously pressurized systems but disadvantageously relies upon orifice size to control air pressurization cycles which would otherwise be more precisely controlled by intelligent processing. There exists a need to reduce the "hunting" of continuously pressurized system without the required use of a small controlling orifice.

The continuously pressurized system senses a voltage indicating the desired tire pressure, and then senses a voltage indicating the actual pressure from the pressure transducer monitoring the actual pressure, and then subtracts the actual pressure from the target pressure. The system then responds to that difference by controllably actuating the inflation and deflation valves. This instantaneous difference method of the continuously pressurized system does not produce an absolute shut off after one inflation or deflation cycle to reach the target pressure. The instantaneous dynamic air pressure which deactivates an inflation or deflation adjustment cycle is different than a static air pressure reached after a small stabilization period and the adjustment cycle. This different may cause further another inflation and deflation adjustment cycles to reach and stabilize at the desired air pressure. Hence, the continuously pressurized system disadvantageously relies upon instantaneously closed loop monitoring with potential over shooting and under shooting requiring several inflation and deflation adjustment cycles to reach and maintain the desired pressure.

Continuously pressurized systems have also been subjected to power supply transients which disadvantageously affected the instantaneous difference method because that differential measurement is made with respect to the reference voltages used to determine both the desire pressure and the dynamic air pressure during inflation or deflation. The differential measurement is made continuously through an inflation or deflation pressure adjustment cycle. A voltage transient, during the inflation or deflation adjustment cycle may adversely affect the differential measurement, perhaps by a premature termination or extension of inflation or deflation period, tending to disadvantageously overshoot or undershoot, causing additions fluctuating inflation and deflation adjustment cycles. These and other disadvantages are solved or reduced using the present invention.

SUMMARY OF THE INVENTION

An object of the present invention is to provide intelligent distributed electronics to reduce the complexity of tire air pressurization systems.

Another object of the present invention is to provide a multiple air channel single manifold tire air pressurization systems.

Another object of the present is to provide intelligent distributed electronics suitable to control a variety of tire air pressurization systems, including single manifold systems, multiple channel single manifold systems, multiple manifold systems, wheel valve systems and continuously pressurized systems.

Yet another object of the present invention is to provide an intelligent distributive field programmable tire air pressurization system for updating operating desired pressures, functions and parameters which may be individually selected and updated for improved operation.

A further object of the present invention is to provide an intelligent distributive field programmable tire air pressurization system for controlling one of many different vehicle models each having respectively required different operating desired pressures, functions and parameters by storing respective blocks of desired pressures, functions and parameters all of which may be selected as a group for a particular vehicle model in which the system is installed.

Yet a further object of the present invention is the use of dynamic offset values which are updated after pressure adjustment cycles to account for changing pressurization characteristics and which are used to control inflation and deflation adjustment cycles.

Still a further object of the present invention is to provide memory within an tire air pressurization system which updated new data for controlling the system will not lose stored data when power is removed from the system so that the system maintains current tire pressure operating desired pressures, functions and parameters even during vehicular restarting.

Yet another object of the present invention is an intelligent distributed tire air pressurization system that uses time delays after termination of pressure adjustment cycles when the system measures stabilized static pressures to controllably maintain desired pressures.

The invention comprises a microprogrammable cab mounted display controller used to control the operation of a variety of tire pressure system having one or more manifolds each having compatible microprocessor based manifold controllers. The cab mounted display controller is connected to one or more tire air pressurizing manifolds each of which distributes pressurized air to a respective set of vehicular tires. The controllers and each includes a four wire communication port for cable attachment. The four wires include power and ground, and a bidirectional differential pair of data lines for communicating data between the display controller and the manifold controllers. A first cable connects the display controller to the first manifold controller. A second cable connects first manifold controller to the second manifold controller. A third cable connects the second manifold controller to a third manifold controller, and so on. Thus, the cable wiring configuration of the systems is daisy chained from the display controller through all of the connected manifold controller for reduced wiring. The display controller communicates commands and receives responses from the connected manifolds controller each responding to predetermined data addresses. Thus, each manifold controller monitors the data lines for respective addresses to prefect intelligent communication with the display controller.

In another aspect of the invention, the display controller includes a display panel with operating indicators, display and controls, such as push buttons, and is used for manual entry of data for updating data in the system. Different displays and controls may be used for changing system desired pressures, functions and parameters. The display controller is programmable through manual entry using the panel. The displays and controls are used to tire pressures, select terrain, and other desired operating conditions, functions and parameters.

In another aspect of the invention, a single manifold is used in combination with a gating means to route pressurized air from the manifold to one of a plurality of air channels to reduce the number of required manifolds.

In yet another aspect of the invention, the manifold controllers use on board memory to store offsets in look up tables used to enhance the control of inflation and deflation cycles to prevent over shoot and under shoot. The offsets are used to adjust desired pressures to target pressures which are used during dynamic pressure adjustment cycles to prefect an absolute shut off during closed loop pressure sensing. The air pressure offsets with an absolute shut off operates to prevent hunting. After the pressure adjustment cycle, the offsets are recomputed to then account for any dynamic changes in system characteristics. The offsets are used to control enhanced pressure adjustment of the tire pressures to maintain the desired pressures.

In another aspect of the invention, offset values dynamically updated and used to maintain tire pressures to the desired pressures. During the course of operation, the system stores desired tire pressures referenced to selected operating conditions. Before a pressure adjustment cycle, the system adjusts desired pressures with the offsets resulting in target pressures. During a pressure adjustment cycle, the system monitors the dynamic air pressure through a transducer and terminates the adjustment cycle when the sensed dynamic air pressure equals the target pressure. After the adjustment cycle, the system then delays to enable the tire pressure to stabilize to a static pressure. After stabilization of the tire pressure the system senses the static tire pressure. The system compares the resulting static pressure to the target pressure, and updates the offset values, so that on the next adjustment cycle, the static pressure will be equal to the desired pressure. The air pressure is periodically adjusted to maintain proper air pressure over dynamic operating conditions. In this manner, the system maintains dynamic offset pressure values which compensate for to dynamic vehicular operating characteristics.

The system is characterized has having an absolute shut off after the pressurization adjustment cycles so as to prevent hunting associated with overshooting and undershooting, while adjusting system performance in the face of ever changing dynamic characteristics resulting from changing conditions, such as temperature, altitude, tire wear and air channel performance, to maintain proper tire desired air pressure over the life of the system.

The present invention uses a large deflation exhaust orifice for rapid deflation reducing the problem of debris clogging, uses an absolute shut off method to avoid hunting, uses time delay measurements to avoid the problems of voltage transients affecting the inflation and deflation cycles and to measure static pressures for improved operations, and uses stored offsets which are dynamically adjusted over time to maintain desired pressures even when the system is subjected to dynamic changing conditions.

In one aspect of the invention, an air tire pressurization system is improved by field programmability. The system maintains the proper air pressure based upon selected controlling conditions, preselected functions and preset parameters. The system maintains the air pressure of the tires within predetermined air pressure bands based upon current operating conditions, functions and parameters. The air tire pressurization system is modified with means on the controller front panel for reprogramming the system when in field use well after initial installment. The cab mounted display controller has a front panel with buttons which enable an operator of the system to reselect operating conditions, and to reprogram desired pressures, enabled functions and preset parameters. The ability to update operating conditions, desired pressures, functions and parameters is particularly useful during initial tire and vehicular testing procedures.

In yet another aspect of the invention, selected functions, operating parameters, and dynamic updated offset values are stored in an erasable programmable ROM which stores data even when the vehicle is turned off during parking when power is removed from the controller of the system. Reprogrammed functions, parameters and updated offset values are not lost when power is removed so that reprogrammed functions and parameters, which enable improved operating performance, are available for immediate used by the system upon a restart.

The present inventions provide means to enable a variety of air system configurations with improved wiring, control and programmability. These as other advantages will become more apparent from the following detailed description of the preferred embodiment.

DETAILED DESCRIPTION OF THE PREFERRED EMBODIMENT

Figure 1A:
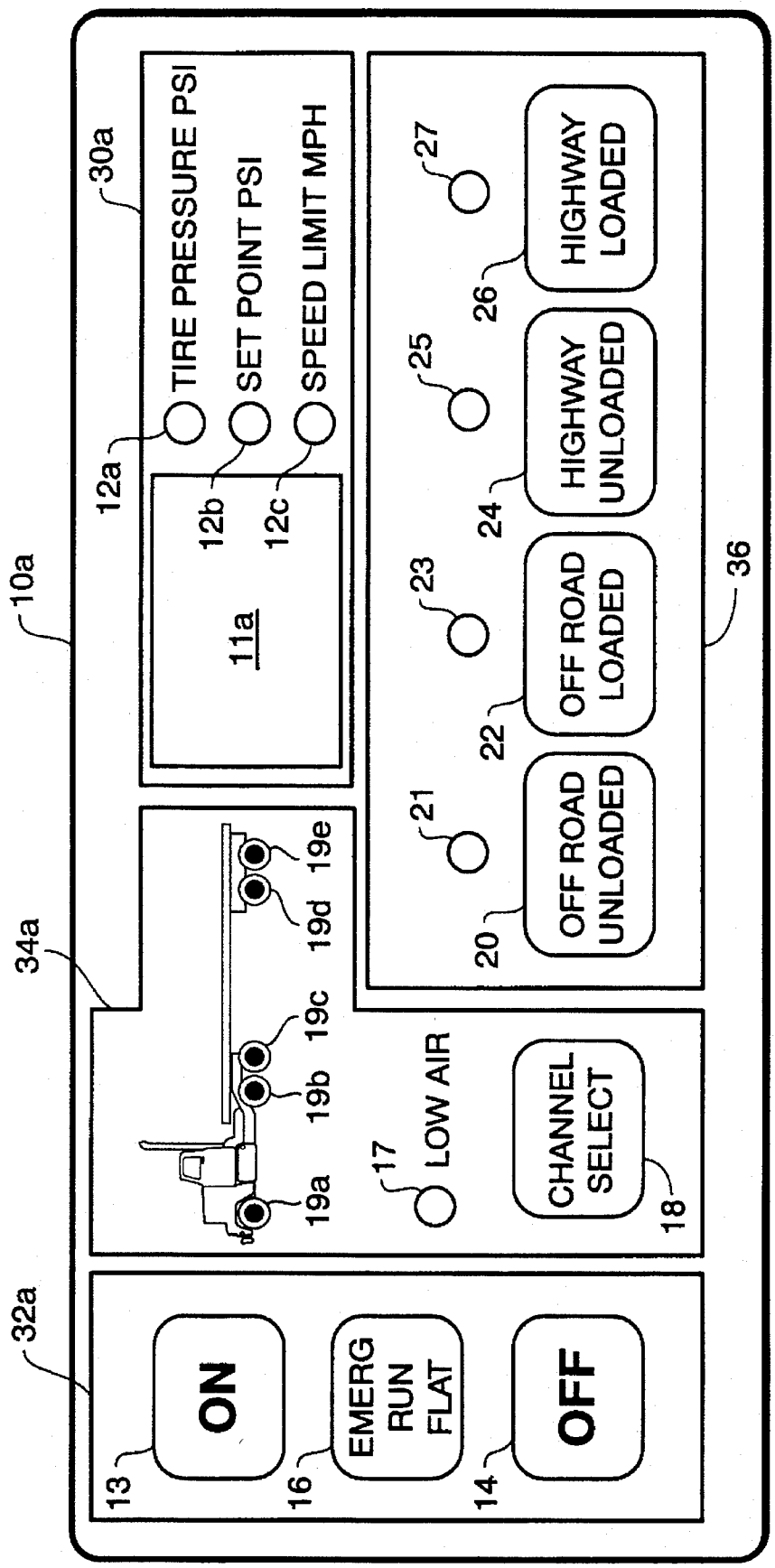
FIG. 1a is a diagram of a front panel of a display controller of a multiple channel air pressurization system.

The present invention covers features of an air pressurization system having vehicular cab mounted controls for controlling the air pressure of the vehicular tires. Referring to FIG. 1a, the system includes a cab mounted panel 10a. The panel 10 in the preferred form has a LCD display 11, a LCD display tire pressure PSI indicator 12a, a LDC display desired set point pressure PSI indicator 12b, a LCD display speed limit MPH indicator 12c, a power on and enter push button 13, and off push button 14, an emergency push button 16a, a run flat push button 16b, a low air indicator 17, an air channel select button 18, air channel select indicators 19a, 19b, 19c, 19d and 19e, an off road unloaded push button 20 and respective indicator 21, an off road loaded button 22 and respective indicator 23, a highway unloaded push button 24 and respective indicator 25, and a highway loaded push button 26 and respective indicator 27. In the preferred form of the invention and for the convenience of the operator, the panel 10a is organized by a display group 30 having display 11 and indicators 12, a control group 32 having button 13, 14 and 16a and 16b, a channel group 34 having indicators 17 and 19 and button 18, and a pressure group 36 having button 20, 22, 24 and 26 and indicators 21, 23, 25 and 27.

Figure 1B:
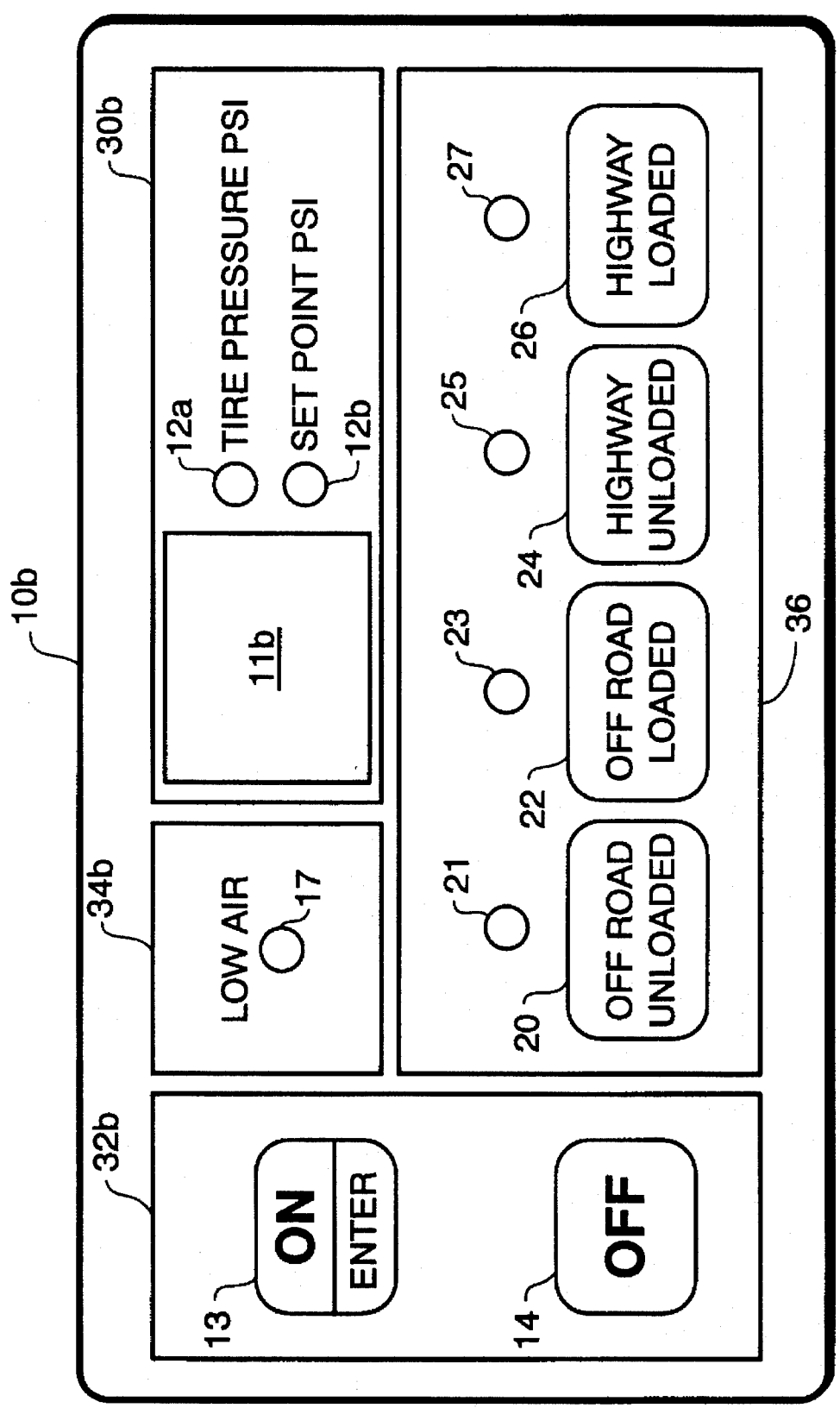
FIG. 1b is a diagram of a front panel of a display controller of single channel air pressurization system.

Referring to FIG. 1b, in an alternative form of the invention, the air tire pressurization system may include a cab mounted panel 10b having a LCD display 11b, a LCD display tire pressure PSI indicator 12a, a LDC display desired set point pressure PSI indicator 12b, the power on and enter push button 13, the off push button 14, the low air indicator 17, the off road unloaded push button 20 and the respective indicator 21, the off road loaded button 22 and the respective indicator 23, the highway unloaded push button and the respective indicator 25, and the highway loaded push button 26 and the respective indicator 27. For the convenience of the operator, the panel 10b is also organized by a display group 30b having display 11b and indicators 12a and 12b, a control group 32b having buttons 13 and 14, and the pressure group 36 having button 20, 22, 24 and 26 and indicators 21, 23, 25 and 27.

Referring to FIGS. 1a and 1b, the panels 10a and 10b may include a varying number of buttons and indicators based upon the complexity of tire air pressure system in which the panels 10 are used. For example, in one alternative embodiment, the panel 10a could include eight membrane push button switches designated as On, Off, Run Flat, Emergency, Highway, Mud-Sand-Snow, Cross-Country, Channel-Select. The panel 10a could have eleven indicators designated Steering tires, Drive Tires, Trailer Tires, Low Air, Set Point PSI, Tire Pressure, Over Speed Limit, Emergency, Mud Snow Sand, Cross Country and Highway. The panel 10a could have a three digit seven segment LCD display 11a. The number and variety of buttons, indicators and display digits may be modified for particular applications enabled by a operator selection using respective computer programs.

The panel 10a is preferably used in a multiple air channel system where sets of tires of the vehicle are organized by air channels, not shown, referenced by indicators 19, whereas the panel 10b is preferably used in a single air channel system wherein all the tires are grouped to a single channel and therefore the panel 10b does not have indicators 19 nor air channel group 34. The air channel select button 18 of panel 10a is used to select the organized sets of tires, for example, the steering tires of indicator 19a, or the drive tires of indicators 19b and 19c, or the trailer tires of indicators 19d and 19e. The low air indicator 17 indicates if the an air supply pressure is lower than a predetermined value. The pressure group 36 preferably includes the four buttons 20, 22, 24 and 26 to be depressed by the operator of the vehicle depending on whether the vehicle is loaded by a predetermined amount of cargo weight, and whether the vehicle in running on a highway or is running off road. The indicators 21, 23, 25 and 27 indicate the current selected operating condition. The particular set of buttons 20, 22, 24 and 26 is well suited for logging truck applications, though other combinations of buttons could be used for other applications. The displays 11a and 11b display information of current conditions, for examples, the tire air pressure when the indicator 12a in activated, the set point desired air pressure when the indicator 12b is activated. The display 11a may also display the vehicle speed, when the speed limit MPH indicator 12c is activated. The control group 32a of panel 10a includes the emergency run flat button which is used in an emergency when one or more of the tires are flat in which case the system will limit the amount of air delivered to a set of tires having one or more flat tires to maintain the tires in a low inflated state so as not to severely drain available air supplies yet provide a minimum amount of inflation suitable for slow leaks.

The panels 10 functions as an input means to direct the accomplishment of one or more of the operational sequences. By pressing the button 20, 22, 24 and 26, the operator can select desired tire pressures which correspond to the selected vehicular operating conditions including terrains and load. The operating conditions selected are indicated by the LEDs 21, 23, 25 and 27, as shown. By selecting one of the operating conditions, the operator selects the desired tire pressure. Traction in various terrains is in direct proportion to the amount of rubber tire in contact with the ground also known as tire foot print. For a given terrain, a varying load easily changes this foot print. If a single desired pressure is used for a given terrain, it can only provide the maximum traction for a given load, for example, a full load. As the load is reduced, the traction will be reduced if the same tire pressure is maintained. Thus, a desired pressure is selected for each terrain load operating condition. A vehicle may have sets of tires each having a respective set of desired tire pressures for each operating condition. Therefore, the terrain load buttons 20, 22, 24 and 26 and air channels represents four desired tire pressures available, for each set of tires.

The system also monitors the speed of the vehicle. Each desired pressure has a safe vehicle operating speed. If the vehicular speed exceeds the safe speed the LED 12c is blinked. If the vehicular speed exceeds the safe for predetermined time period, for example, one minute, the over speed LED 12c is flashed. If the over speed condition continues for another predetermined time period, the system may automatically adjust the tire pressure corresponding to the increased speed. One of the four LEDs 21, 23, 25 or 27 representing the next higher pressure and speed operating condition will start blinking and the system will inflate all tires to the next higher desired pressure and will then turn off the over speed LED 12c.

Figure 2A:
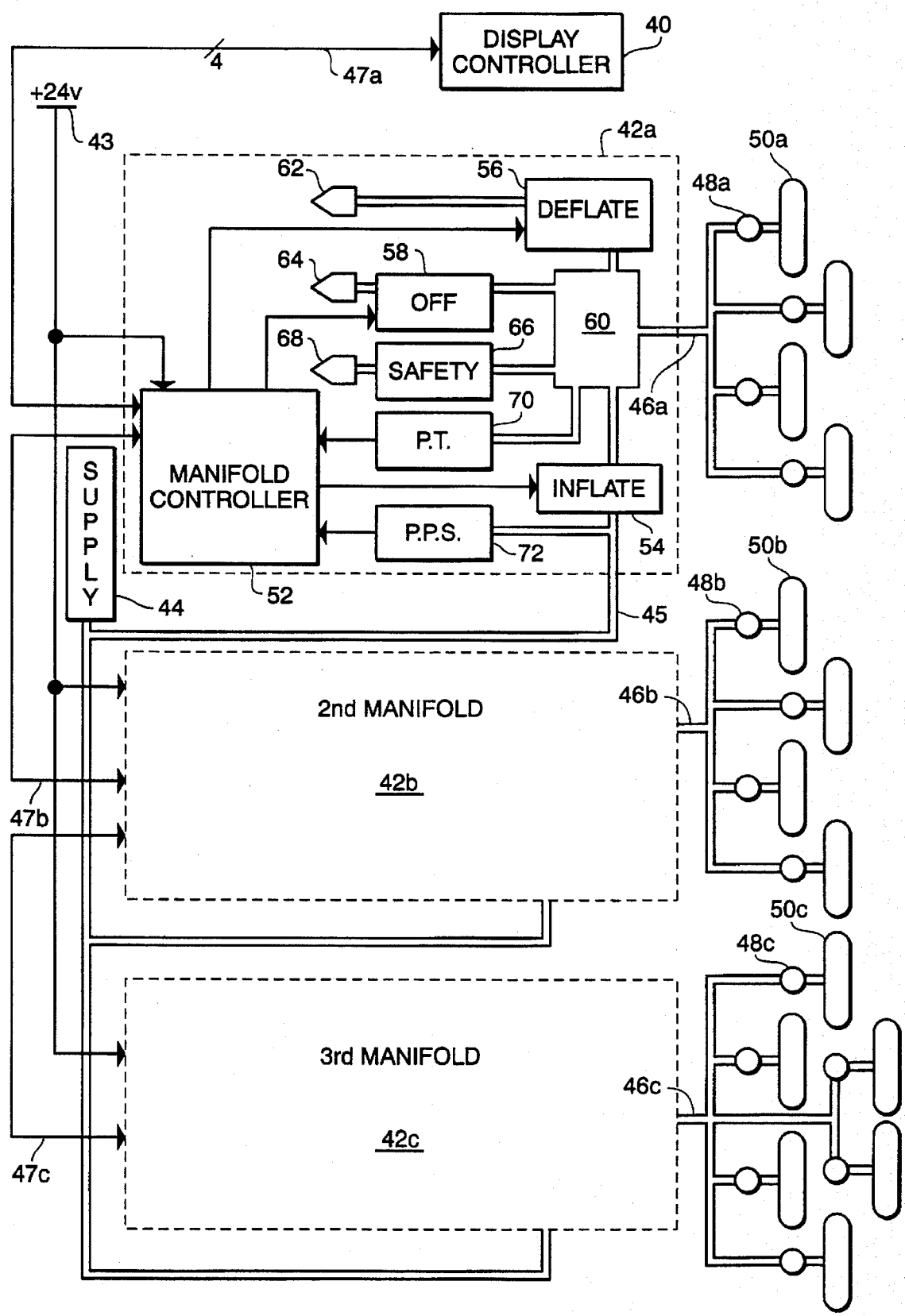
FIG. 2a is a block diagram of a multiple-channel multiple-manifold air pressurization system.
Figure 2B:
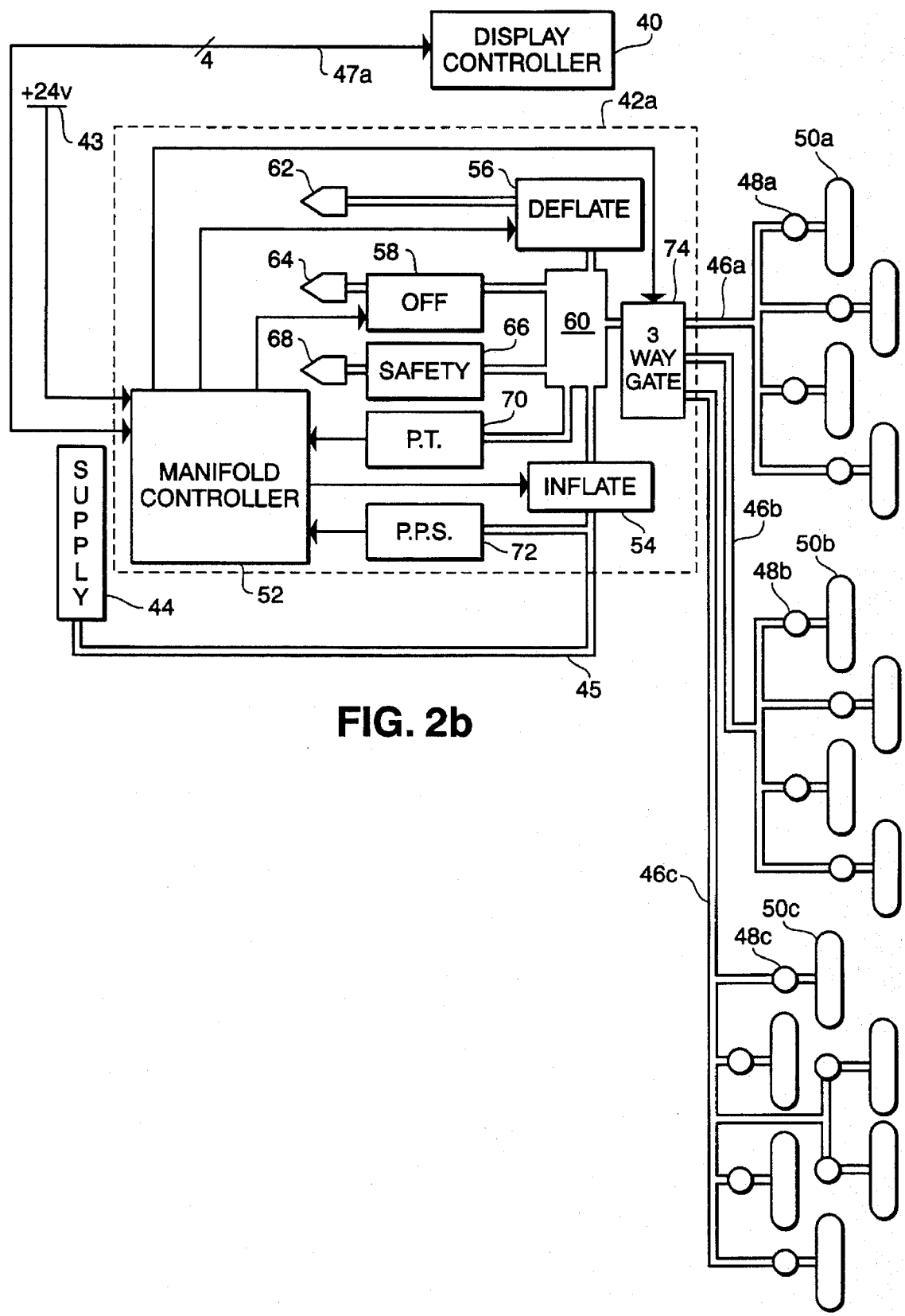
FIG. 2b is a block diagram of a multiple-channel single-manifold air pressurization system.
Figure 2C:
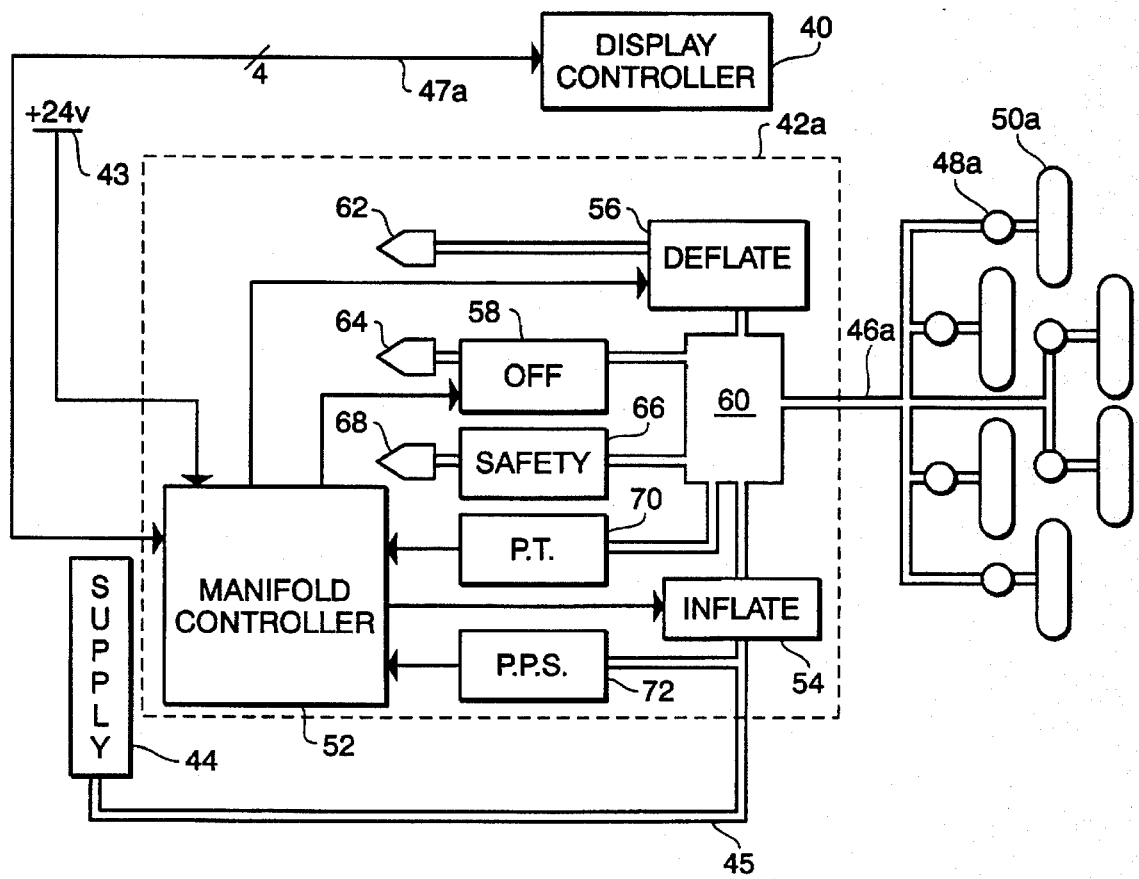
FIG. 2c is a block diagram of a single-channel single-manifold air pressurization system.
Figure 2D:
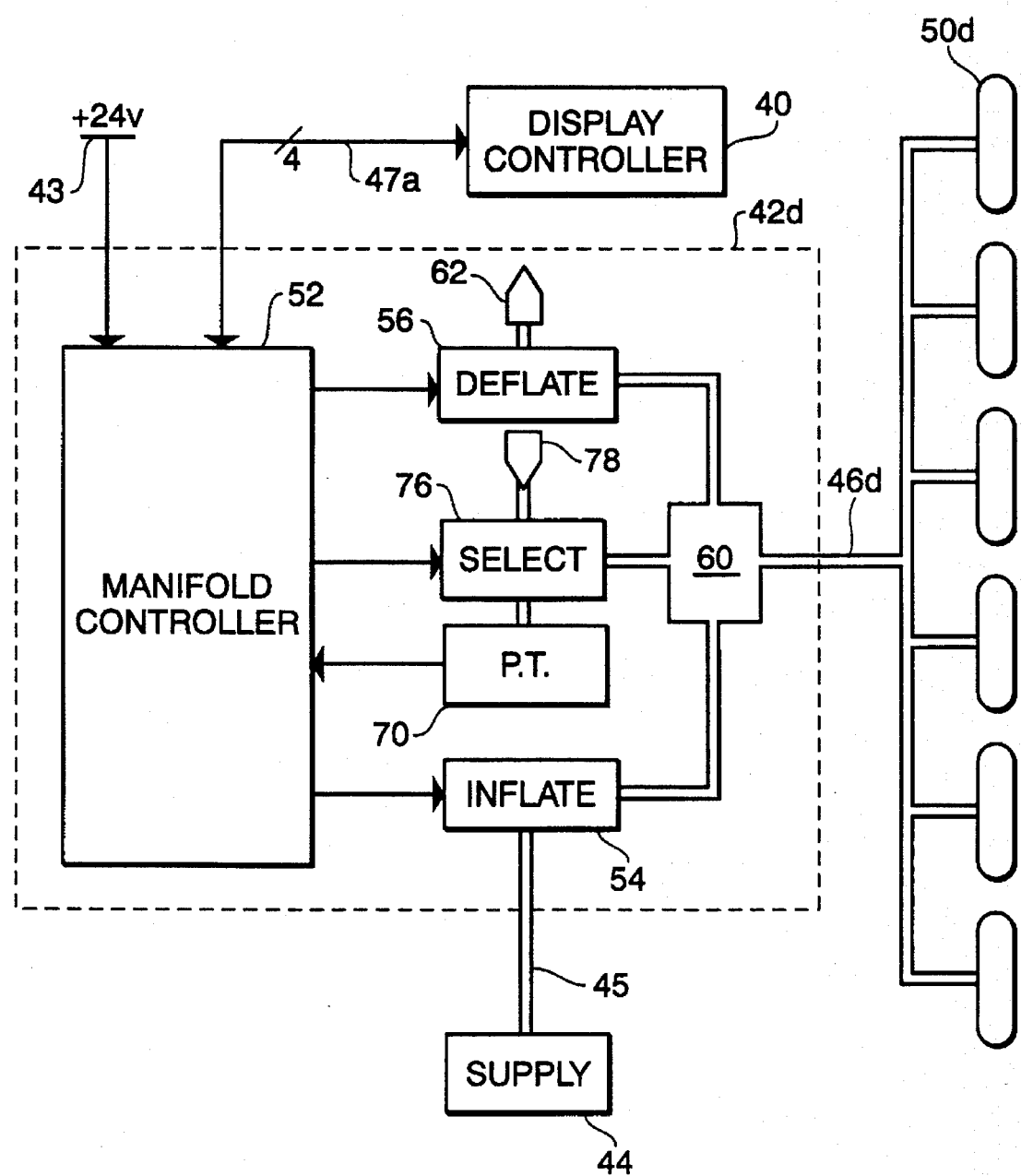
FIG. 2d is a block diagram of a single-channel single-manifold continuous air pressurization system.

The panel 10a is specifically adapted for the multiple air channel systems, examples of which are shown in FIG. 2a and 2b, whereas the panel 10b is specifically adapted for single air channel systems, examples of which are shown in FIG. 2c and 2d. The panel 10a and air system of FIG. 1a is well suited for tire air pressurization systems installed in heavy commercial trucks. The panel 10a and the tire air system of FIG. 1b is particularly suited for tire air systems installed in heavy military vehicles. The panel 10b and the tire air systems of FIGS. 2c are well suited for light commercial vehicles. The panel 10b and the tire air system of FIG. 2d are particularly suited for light military vehicles.

Referring to FIGS. 2a, 2b and 2c, a cab mounted controller 40 is used to control air manifolds 42a, 42b and 43c. The controller 40 functions to regulate the tire air pressure by controlling the operation of the manifolds 42. Operational control of system lies in the controller 40 having one of the input keypad display panels 10a or 10b of FIGS. 1a and 1b, respectively. In FIG. 2a, the three manifolds 42a, 42b and 42c receive electrical power from vehicular 24 V battery supply 43. The manifolds 42 supply pressurized air from an air source 44 through a supply conduit 45 into one of three air channels 46a, 46b and 46c. In FIG. 2b, the manifold 42a supplies pressurized air from the air source 44 through the supply conduit 45 into one of the three air channels 46a, 46b and 46c. In FIG. 2c, the manifold 42a supplies pressurized air from the air source 44 through the supply conduit 45 into only one air channel 46a. Each of the air channels 46a, 46b and 46c is connected through a respective set of wheel valves 48a, 48b and 48c, with only one wheel valve in each set referenced designated as such, and to a respective channel set of tires 50a, 50b and 50c, with only one tire in each set referenced designated as such.

The air systems can preferably support from one to four manifolds 42. As the number of manifolds 42 increases, the amount of cabling increases. A first cable 47a extends from controller 40 to the first manifold 42a. A second cable 47b extends between the first manifold 42a and the second manifold 42b. A third cable 43c extends between the second manifold 42b and the third manifold 42c. With the use of a fourth manifold, not shown, a fourth cable, not shown, would connect between the third manifold 42c and the fourth manifold having a respective air channel, set of wheel valves and set of tires, all of which also not shown.

Referring to FIG. 2d, the system may not include the wheel valves 48, and as such, the system would operate as a continuously pressurized system. The continuously pressurized system would however include the controller 40, the cable 47a, a manifold 42d also supplying air from the air source 44 through the supply conduit 45 into a continuously pressurized air channel 46d to pressurize a set of tires 50d.

Referring to FIGS. 2a, 2b, 2c and 2d, the systems preferably use four wire cabling of cables 47 with two wires used for supply power and the other two for communicating digital data signals. The four wires include power and ground, and a bidirectional differential pair of data lines for communicating digital data between the controller 40 and each of the attached manifolds 42. Both the controller 40 and the manifolds 42 use serial communications over the bidirectional data lines. The manifolds 42 and controller 40 communicate with each other over cables 47 with the controller 40 communicating commands and the manifolds 42 communicating responses to the commands in a master slave relationship. Each manifold 42 will respond to a digital address and respective commands communicated on the cables 47 from the controller 40.

Referring to FIGS. 1a and 2b, and in a case of a commercial logging truck application, one of which is shown in the channel group 34 of the panel 10a having indicators 19 representing tires, the number of relatively expensive manifolds 42 may be reduced to only one manifold 42a used to supply pressurized air to the three separate air channels 46a, 46b and 36c. The air channel 46a is shown to be connected to four tires 50a by example, but is preferably connected to only the two steering tires 50a as is standard on logging trucks and referenced by indicator 19a. The air channel 46b is shown by example to be connected to only four tires 50, but is preferably connected to eight drive tires 50 as is standard on logging trucks and referenced by indicators 19b and 19c. The air Channel 46c is shown by example to be connected to only six tires 50b, but is preferably connected to eight rear trailer tires 50c as is standard on logging trucks and referenced by indicators 19d and 19c. In the system, the controller 40 control only one manifold 42a to sequentially adjust the air pressure in all three air channels 46, but only one at time. The single manifold 46a is sequentially operated to control the air pressure in a plurality of tire air pressure channels 46. Only one set of tire 50a, 50b or 50c may have an air pressure adjustment cycle at any one time. Whereas, the system of FIG. 2c, having three manifolds 42a, 42b and 42c can have the air pressure of all three sets of tires 50a, 50b and 50c adjusted at the same time by simultaneously control and operation of all three manifolds 42. Each of the manifolds 42a, 42b and 42c can be operated independently of the other to adjust tire pressures in differing respective channels 46a, 46b and 46c, at the same time. Hence, there is trade off in cost and performance in multiple air channel system having either one manifold 42a or a plurality of manifolds 42a, 42b and 42c. In certain military applications, where a rapid response time in required, a respective manifold 42 is required for each air channel 46 each having a set of tires, whereas in certain commercial logging applications only one manifold 42a may be desired.

Referring to FIGS. 2a, 2b and 2c, each of the manifolds 42 function to intelligently interact with the controller 40 to control the air pressure of the air channels 46 having respective sets of wheel valves 48 and respective sets of tires 50. Each of the manifolds 42 has a manifold controller 52 controlling the operation of an inflation valve 54 for increasing the tire air pressure, a deflation valve 56 for decreasing the tire air pressure, and a shut off valve 58 for closing wheel valves 48 for stabilizing the tire air pressure. The valves 52, 54 and 56 vary the air pressure in a central cavity 60 and air channels 46 connected to the valves 54, 56 and 58.

The inflation valve 54, when activated, communicates air under a high air pressure from the air supply 44 through the conduit 45 into the cavity 60 through the air channels 46 to inflate the tires 50 through the wheel valves 48. Electronic modulation of the inflation valve 54 can be used precisely control the inflation rate.

The deflation valve 56, when activated, communicates air under a lower air pressure from the cavity 60 to atmosphere through a deflation exhaust orifice 62 functioning to limit the rate of decrease the air pressure in the cavity 60 during deflation of the tires 50 through the wheel valves 48. This rate can also be affected by variable orifice sizes where the flow can be regulated to have increased flow at higher pressure and normal flow at lower pressure. The electronic modulation of the deflation valve 56 can be used to precisely control deflation exhaustion air flow rates to atmosphere. The overall effect of the modulation of deflation valve 56 is to reduce the total deflation time for each tire pressure adjustment cycle to accommodate only one size orifice 62.

The shut off valve 58, when activated, communicates air under a very low pressure to atmosphere through a larger shut off exhaust orifice 64 functioning to quickly lower the air pressure in the cavity 60 and the connected air channel 46 to shut off the connected air pressure activated wheel valves 48 to stabilize the tire pressure in the tires 50. The shut off valve 58 is energized into an open position which produces a rapid decay of pressure in the cavity 60 and connected air channel 46 causing the wheel valve 48 to close. The orifice 64 is typically large to permit rapid evacuation of the air channel 46 and permit the ejection of debris that might otherwise clog the wheel valve 48, air channel 46 and cavity 60.

A safety valve 68 opens to communicate air to atmosphere through a safety orifice 66 when the air pressure of the cavity 60 exceed a predetermined valve. The safety valve 68 is preferably a spring loaded ball pressure fit valve communicating air to the orifice 66 for exhaust.

The display controller 40 and the manifold controller 52 control the tire air pressure using stored microcomputer programs. Pressure control have been migrated to the manifold controller 52 which controls the operation of the valves 54, 56 and 58 based upon stored programs and parameters, communications with the controller 40 now serving as an operator interface. A pressure transducer 70 communicates an electronic signal indicating the air pressure of the cavity 60 to the manifold controller 52. A priority pressure switch 72 communicates a low air supply pressure indication to the manifold controller 52. The manifold controller 52 receives inputs from the transducers 70 and 72 for operational control. The pressure transducer 70 provides a voltage signal to the controller 52 indicating the air pressure of the cavity 60. The priority pressure switch 72 is in either an on or off state indicating if the supply air pressure in conduit 45 has fallen below a predetermined value, for example, eighty PSI, so that the controller 52 will not activate the inflation valve 54 to conserve the air supply giving priority to other systems, such as an air brake system, not shown, which may also drain air for the supply 44. The pressure priority switch 72 functions to continuously monitor the air supply 44. When the supply pressure drops and an inflation adjustment cycle begins, the system may completely turn off the inflation valve 54 or may modulate the inflation valve 54, in either case to reduce inflation air flow to maintain a minimum air supply pressure to conserve the air supply 44. The flow characteristics of typical compressors of the air supply 44 allows for a minimum air drain and modulating the inflation air flow to reduce the frequency of shut off operations achieves reduced inflation times under low air supply pressures.

The priority pressure switch 72 could be an analog measuring transducer like the pressure transducer 70. The priority pressure switch 72 could also be directly connected to the shut off valve 58 to turn off the wheel valves 48 to stabilize the tire air pressure and also be directly connected to the inflation valve 54 to disable the inflation valve 54 preventing additional drain of the air supply 44 during a low pressure condition of the air supply 44 as sensed in the conduit 45.

The manifold 42a of FIG. 2b The controller 52 also electronically controls a three way gating means 74 for communicating pressurized air the manifold cavity 60 to one of the connected air channels 46a, 46b or 46c. The gating means 74 would be used to reduce the number of manifolds to one, but would then prevent simultaneous pressure adjustment of the various sets of tires 50.

Referring to FIG. 2d, the manifold 42d of the continuously pressurized system also includes a manifold controller 52, deflation valve 56, deflation exhaust orifice 62 and inflation valve 54 for controlling the air pressure of the cavity 60 connected to the continuously pressurized air channel 46d communicating pressurized air to the tires 50d which would include all of the tires, including steering, drive and trailer tires. The system does not use wheel valves and is thus continuously pressurized. The manifold 42d also includes the pressure transducer 70 which is connected to the cavity 60 through a select valve 76. The select valve 76 either communicates atmosphere through a select orifice 78 or communicates the air pressure of the cavity 60 to the transducer 70. The transducer 70 provides the manifold controller 52 with an atmosphere pressure reading or a cavity pressure reading. In the continuous pressurized system of FIG. 2d, the manifold controller 52 controls the select valve 76 to either sense the air pressure of cavity 60 and therefore the pressure of the air channel 46d or to sense atmosphere. The selector valve 76 routes either atmosphere or cavity pressure to the pressure transducer 70. The atmosphere pressure may be used to store an atmosphere null value for subsequent null adjustment of the sensed air channel pressure. In addition, the continuous pressurized system may not have a priority pressure switch, not shown, when the air supply 44 is not shared, for example, with an hydraulic air braked system. The priority pressure switch could be added to disable the deflation valve 56 and inflation valve 54 in the event of low air supply pressure in the conduit 45.

Figure 3:
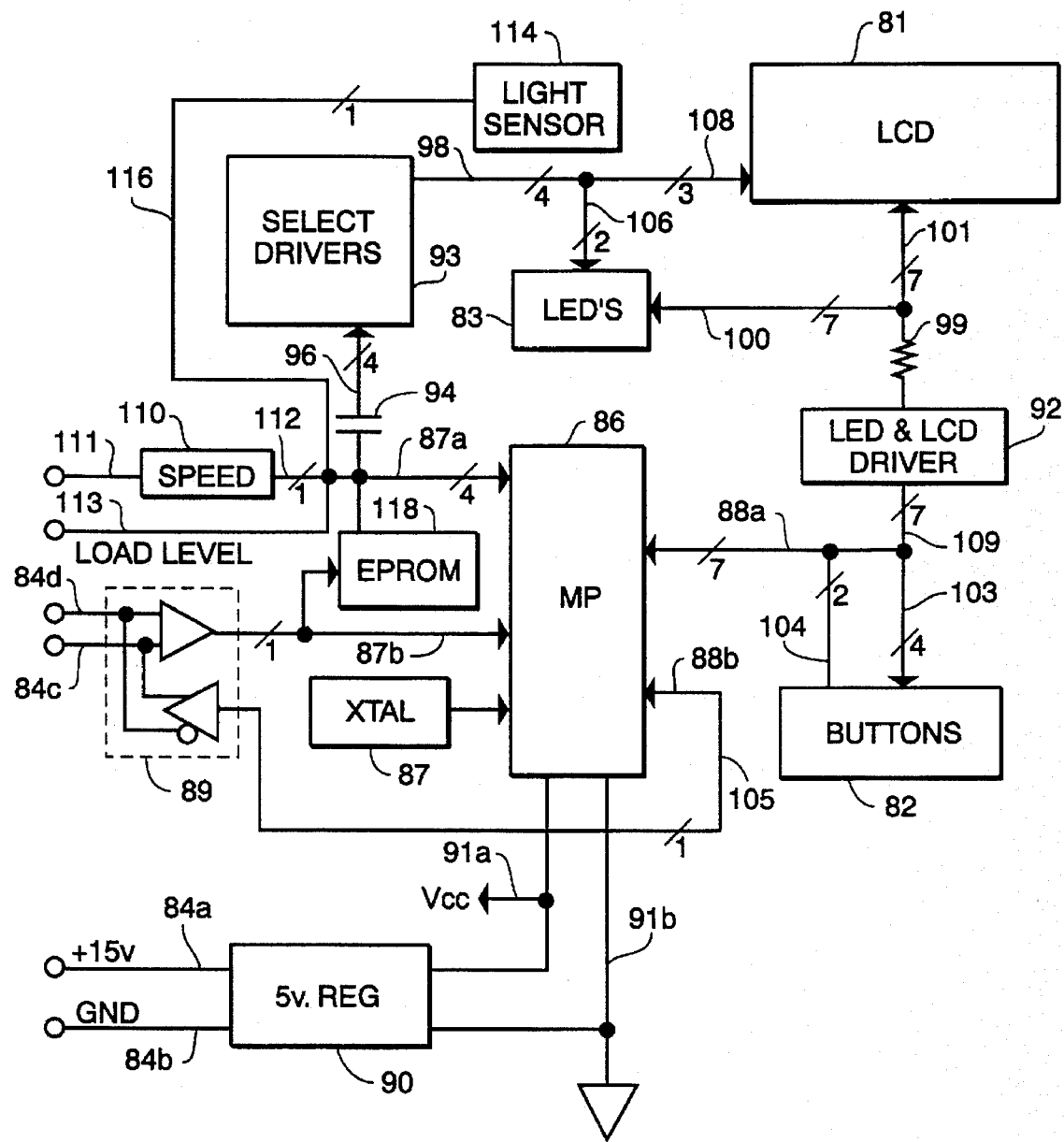
FIG. 3 is a schematic diagram of the display controller electronics.
Figure 4:
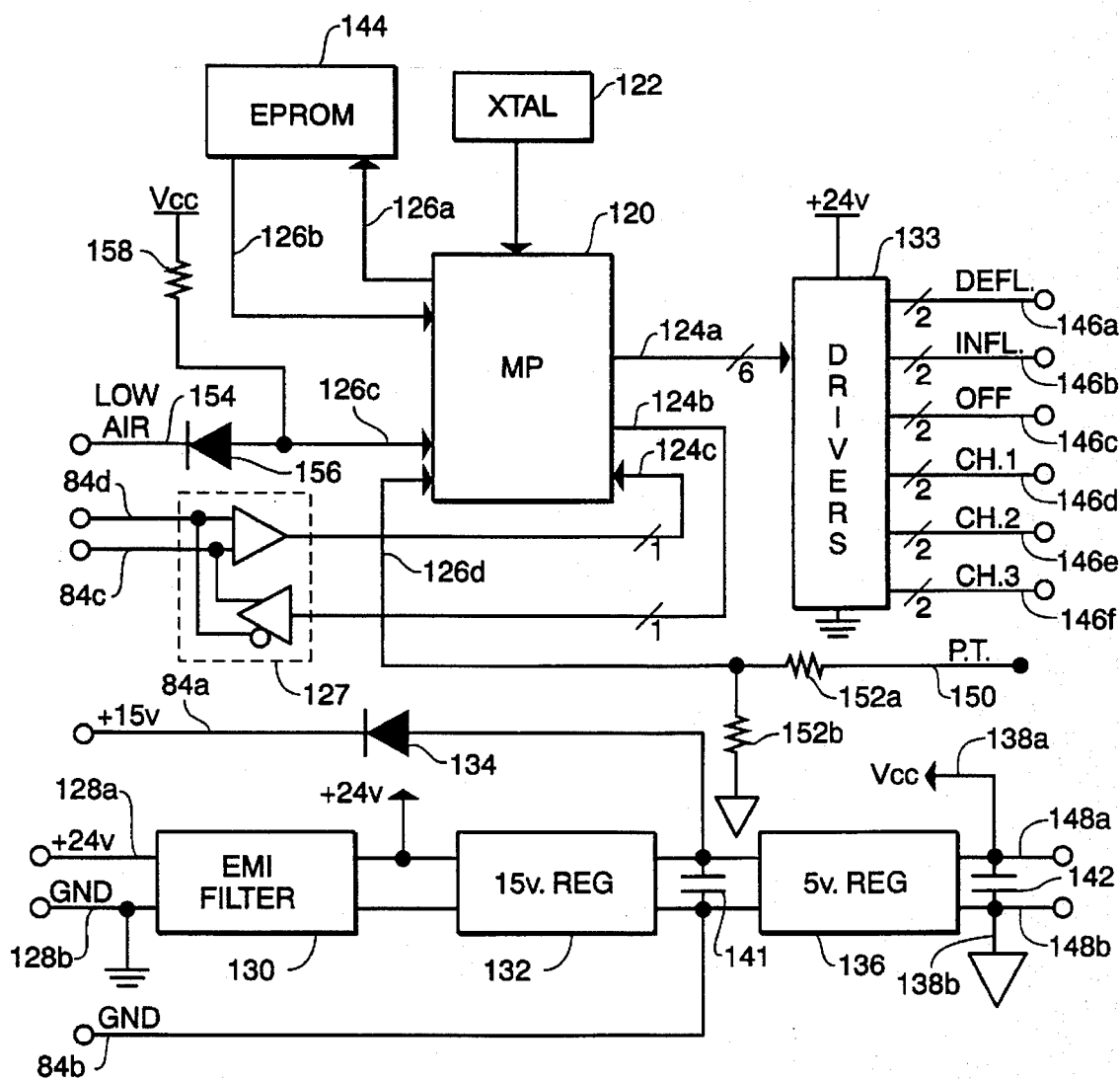
FIG. 4 is a schematic diagram of the manifold controller electronics.

Referring to all of the Figures, the display controller 40 is shown by way of schematic in FIG. 3, and the manifold controller 42 is shown by way of schematic in FIG. 4. The LCD display 11a or 11b of FIG. 1a and 1b are shown as LCD 81 in FIG. 3. The membrane push buttons 13, 14, 16a, 16b, 18, 20, 22, 24, 26 of FIGS. 1a and 1b are shown as buttons 82 in FIG. 3. The indicators 12a, 12b, 12c, 17, 19a, 19b, 19c, 19d, 19e, 21, 23, 25 and 27 of FIGS. 1a and 1b are shown as LEDs 83 in FIGS. 3. The cable 47a, 47b or 47c in FIGS. 2a, 2b, 2c and 2d is shown by lines 84a, 84b, 84c and 84d in FIGS. 3 or 4. The +24 V supply 43 in FIGS. 2a, 2b, 2c and 2d is shown as being a 24 V signal on line 85 with vehicular chassis ground also connected to line 84b.

Referring to FIG. 3 which is a schematic of the display controller 40 of FIGS. 2a, 2b, 2c and 3d, the display controller 40 is microprocessor controlled using a microprocessor 86 driven by an oscillator 87. The oscillator 87 preferably operates at 3.6864 MHz. The microprocessor 86 is preferably a PIC16C71A device though other microprocessors and oscillators may function equally as well. The microprocessor 86 has built in EPROM for microcode program store. The microprocessor 86 has five bidirectional analog I/O lines 87a and 87b, and eight bidirectional digital lines 88a and 88b. The analog I/O lines 87 can be used to communicate digital type signals.

A transceiver 89 is used to communicate serial data signal on lines 84d and 84c to lines 87b and 88b, respectively. The transceiver 89 is used to send commands and receive responses. The transceiver 89 would include terminating resistors, not shown, and decoupling resistor capacitor filters, also not shown, connected to lines 84d and 84c. Such termination and decoupling are well known techniques. The transceiver 89 is preferably a MAX485 transceiver. The transceiver 89 provides differential input output digital data communication.

The controller 40 receives +15 V power and ground power signals on lines 84a and 84b respectively from a connected manifold controller 52. The power and ground signals on lines 84a and 83b are routed to a voltage regulator 90 supplying the controller 40 with +5 V Vcc power 91a and ground 91b. The 5 V regulator 90 receives +15 V from the manifolds 52 and provides a regulated +5 Vcc to components within the display controller 40. The +5 V regulator 90 is preferably an LM7805 voltage regulator with input and output decoupling filter capacitors, not shown.

The LCD segment drivers 92 and the select drivers 93 contains FETs, not shown, though other transistor devices used as suitable for driving and selecting LED indicators 83 and LCDs 81. The select drivers 92 have four FETs driven through four respective 0.1uf capacitors 94 in series in the analog lines 96. The capacitors 94 limit the time duration of select signals on lines 98 which select the LEDs 83 or the data of the LCD 81. In addition, four gate to source connected 100K ohm resistors, not shown, are used to bias to the four FETs of the select drivers 93. The select drivers 93 are used to generate select signals on lines 98 whereas the segment drivers 92 drive individual LCD segments of the LDC 81 or the individual indicators of LEDs 83.

The bidirectional data lines 88a are used for input sensing of the button 82 and output drive of LCD 81 and LEDs 83. The LED LCD driver 92 has seven FET transistors used to drive either the LCD data of the LCD 81 or to drive the LEDs 83. The FET drivers 92 are connected to seven series connected current limiting resistors 99, connected between the respective drains of the seven FETs of driver 92 and seven LED drive inputs 100 and seven LCD segment inputs 101. To sense the state of the buttons 82, the data line 88a are sequentially pulsed low on four lines 103 of the data lines 88a, as two inputs lines 103 of lines 88a are read by the microprocessor 86. After four sequential read operations, all eight of the button 82 are read. During the sensing of the push buttons 82, the FET transistors of the select driver 93 do not activate the LEDs 83 nor the LCD 81 because microprocessor 86 dose not provide select signals to the select drivers 93. The microprocessor 86 can also sense incoming serial data on line 105 from the transceiver 89.

One portion of the LEDs 83 or digit of the LCD 81 is turned on at a time. The LEDs 83 are grouped into two banks and the LCD data are grouped into three digits. The four select lines 98 select data of the LEDs 83 and digits of the LCD 81 while the drive signals on lines 101 are used to sink current to activate both of the LEDs 83 and LCD 81. A first select line of lines 106 selects the LEDs 83 using all seven drive signals on lines 100. A second select line of lines 106 selects the remaining four of the LEDs 83 using four of the drive signals on lines 100. This second select line of select lines 106 is also used in lines 108 to select a first high order digit of the LCD 81 using two of the drive signals on lines 101. A third select line of lines 108 select a second digit of the LCD 81 using all seven of the drive lines 101. A fourth select line of lines 108 selects a last and low order third digit of the LCD 81 also using all seven of the drive lines 101. As the select driver 93 selects the LEDs 83 and LCD 81, the LED and LCD driver 92 turn on respective LEDs 83 and digits of the LCD 81 effectuating a display of LEDs 83 and LCD 81.

The LEDs 83 and LCD 81 are pulsed activated when the microprocessor 86 is not sensing the state of the buttons 82. The microprocessor 86 drives the select drivers 93 to provide select signals on lines 98 which selects in sequence portions of the LEDs using lines 106 and digits of LCD 81 using lines 108 during which time active drives signal lines 109 turn on the FETs of the driver 92. The microprocessor 86 is programmed to cycle through sensing the buttons 82 and activating the LEDs 83 and LCD 81 a predetermined number of times each second. The number of LCD and LED activations is sufficiently high to provide to the human eye with a constant display without apparent flickering.

The display controller 40 also includes a speed circuit 110 for receiving a speed transducer signal on line 111 from the subject vehicle. The speed circuit 110 converts the speed signal on line 111 into an appropriate analog signal on one of analog input lines 87a of the microprocessor 86, though other digital conversion techniques would work equally as well for a microprocessor having only digital signal inputs. If the vehicle provides a digital input signal on line 111, the speed circuit 110 could shape the speed signals into signals for the microprocessor 86. The microprocessor 86 periodically senses an output of the speed circuit 110 on line 112 and determines the speed of the vehicle. The speed of the vehicle is processed by the microprocessor 86 in connection with control of the system. Speed signal on line 111 may be a zero to five volts analog input representing MPH speed. The speed circuit 110 may be a digital to analog converter for microprocessor 86. The speed input signal 111 may also be a frequency modulated digital signal communicated to the microprocessor 86 sampling the signal where the frequency is related to vehicular speed. An optional load level line 113 may be connected to a vehicular load level sensor, not shown. A load converter buffer circuit may provide an analog voltage representative of a vehicular load level. The load level signal may be used in combination with selected operating conditions to select vehicular speed limits and desired tire air pressures. In the preferred form, the buttons 82 are used to input operating conditions, including both terrain and load levels which are used by the microprocessor 86 to select speed limits and desired pressures.

The controller 40 further includes a light sensor 114 having an output on line 116 which is connected to one of the analog inputs on lines 87a. The light sensor 114 is used for sensing the ambient light intensity in the cab where the controller 40 is located. The light sensor output on line 116 is periodically sensed by the microprocessor 83 which uses the light sensor output to reduce or increase the pulse width of the select signals on lines 96 driving the select drivers 83 to reduce or increase the amount of drive time of the LEDs 83 and LCDs 81. As the ambient light decreases, the LEDs 83 and LCDs 81 are activated for a longer time to compensate for the ambient light interference.

The controller 40 also preferably includes an external EPROM memory 118 which may be a 24C02A type EPROM. The memory 118 is preferably a non volatile memory which can be altered with new data during operational use. The EPROM 118 provides additional memory for microprocessor 86 particularly useful for storing updated data which is not lost when power is removed. The EPROM 118 is preferably used for storing updated data such as programmed desired pressures, functions and function timer values, or other data defining the operational macro control characteristics unique to vehicle in which the display controller 40 is placed. When power is removed, the data in EPROM 118 is not lost but can be used again during the next operational use of the vehicle. In the preferred form, the EPROM 118 serially communicates data to the microprocessor 86 over one of the lines 87a and receives serial data from the microprocessor 86 over line 87b, multiplex with data from the transceiver 89.

The controller 40 could be modified to include a black out input or a push button, both not shown, to provide a black out signal indicating a black out mode when all vehicular LEDs, displays and lights are to be turned off. The black output signal, not shown, would be used by the microprocessor 86 to disable the activation of the LEDs 83 and LCDs 81 during the black out mode particularly desired in military applications.

Referring to FIGS. 2b and 4, the latter of which is a schematic of a manifold controller 52 of type specifically adapted for the system shown in FIG. 2b, a microprocessor 120 is also driven by an oscillator 122. The microprocessor 120 is also preferably a PIC16C71A type device, and the oscillator 122 also preferably operates at 3.6864 MHz. The microprocessor 120 also has eight bidirectional data lines 124a, 124b and 124c, and uses four bidirectional analog lines 126a, 126b, 126c and 126d. The manifold controller 52 is connected to the system cable 47a of FIG. 2b having power lines 84a and 84b and having bidirectional differential pair communications data lines 84c and 84d connected to a transceiver 127 which is also preferably a MAX485 transceiver also having series connected terminator resistors and input decoupling resistors and capacitors, all not shown. The lines 84c and 84d may communicate data at 9600 baud with one start one stop bit.

The vehicular battery 43 providing +24 V power is routed to each of the manifolds 42, and particularly to the manifold controller 52 of FIG. 2b. The +24 V battery supply is connected at input lines 128a and 128b which are routed to an EMI filter 130 which filters the noise transients especially during ignition of the subject vehicle. EMI filter 130 include a series connected input rectifying diode and a chock inductor connected to parallel connected zener diode and filter capacitor, all not shown, which design is a well known input filtering design. The EMI filter 130 uses the choke and filters to reduce voltage spikes which might otherwise cause failure of the microprocessor 86 and cause sensing problems of the pressure transducer 70. The EMI filter 130 provides a filtered +24 V power signal to a +15 V voltage regulator 132 which is preferably an LM7815 device. The EMI filter 130 also provides the +24 V power and ground signals to FET drivers 133 comprising six FETs with respective solenoid induction protection diode, both not shown, used to actuate six solenoids, not shown. The first solenoid actuates the deflation valve 56, the second solenoid actuates the inflation valve 54, the third solenoid actuate the shut off valve 58, and the remaining three solenoids actuate the three way gate 74 to respectively open an air passage between the cavity 60 and the three air channels 46a, 46b and 46c.

In the case of a system using multiple manifolds 52, only one manifold 42 needs to have a 15 V regulator 132 to supply the display controller 40 the +15 V power signals on lines 84a and 84b through a diode 134 which may permit a plurality of +15 V rectifiers 130 from a plurality of manifolds 52 to supply power on the lines 84a and 84b. The 15 V regulator also supplies the +15 V power signals to a +5 V regulator 136 providing +5 V Vcc and ground power signals on lines 138a and 138b, respectively. The regulators 132 and 135 have output filtering capacitors 141 and 142, respectively. The battery +24 V supply on lines 128 are used to provide both the +15 V power and ground on lines 84a and 84b, and the +5 V Vcc power and ground on lines 138. The +5 V Vcc power and ground signals on lines 138 are routed to the microprocessor 120, the transceiver 127, and an external EPROM 144 which may be a 24C02A type EPROM. The memory 144 is preferably a non volatile memory which can be altered with new data during operational use. The EPROM 144 provides additional non volatile memory for microprocessor 120 particularly useful for storing updated data which is not loss during loss of power. The EPROM 144 is also preferably a non volatile memory which can be altered with new data such as offset look up tables and parameters unique to the air channel 46 to which the manifold controller 52 is connected. In the preferred form, the EPROM 144 communicates serially data between the microprocessor 120 over lines 126.

The microprocessor 120 uses lines 124a to drive the FET drivers 133 having the six FETs actuating the deflation valve 56, inflation valve 54, shut off valve 58 and a first, second and third air channel valves of the gating means 74 through respective pair of lines 146a, 146b, 146c, 146d, 146e and 146f, particular to the system embodiment of FIG. 2b. If the gating means 74 is not used, then only three FETs of drivers 133 would be required.

The microprocessor 120 also uses line 124b for providing output data to the display controller 40, and uses line 124c for receiving input data from the controller 40 over lines 84a and 84b. With the use of multiple manifolds, for example, as shown in FIGS. 2a, the lines 84a and 84b of the cables 74 may be wired ORed at each of the manifold controller 52. Alternatively, repeater communication circuits may be used within the controller 52 to reliably communicate the data signals between all of the manifolds controllers 52 and the display controller 40.

The air cavity pressure transducer 70 receives a +5 V Vcc and ground inputs from the +5 V regulator 136 and lines 148a and 148b, respectively. The pressure transducer 70 provides an input on line 150 which is voltage divided by two resistors 152a and 152b providing a pressure signal on line 126d to the microprocessor 120.

The priority pressure switch 72 is a priority switch transducer having a switch which is an on off switch that either provides an open circuit or a connection to chassis ground indicating low air through line 154 having a protection diode 156 connected to line 126b. A pull up resistor 158 provides a high signal when the pressure switch 72 is in an open circuit condition indicating that the air supply pressure is not low. When the pressure of the air pressure of the conduit 45 drops below a predetermined value, for example, eighty PSI, the priority pressure switch 72 closes providing the microprocessor 120 with a indicating ground signal on line 120. The priority pressure switch 72 is only used when sharing a common supply with vehicular air brakes, not shown. The air systems are typically designed to give priority of low air pressure to the brakes rather than to maintain a desired tire air pressure. In an alternative form, when the tire air pressurization system has a dedicated air supply, the priority pressure switch 72 may not be used.

Referring to all of the Figures, the display controller 40 uses the microprocessor 86 having internal memory to store operational programs and EPROM 118 memory for storing updated data including updated desired tire pressures and speed values for the selected operating condition, e.g. highway and loaded. The system is preferably field programmable allowing an operator to update the desired pressure and speed values, among other data. The microprocessor 86 of the display controller 40 issues commands to the attached manifold 42 and specifically to the manifold controllers 52 based upon state of the control buttons 82, the desired tire pressure values, speed values, vehicular speed, enabled functions and operating parameters. The commands are directed to specific manifolds 52 to provide a desired air pressure of respectively attached set of tires. Each manifold controller 52 has a microprocessor 120 with internal memory for storing pressurization programs and EPROM memory 144 for storing updated data such as pressurization parameters for controlling the air pressure of the respective attached tires based upon commands received from the display controller 40. The EPROM 144 store data unique to each respectively connected air channels 46.

The system uses EPROM memory 118 and 144 for storing updated data which is not lost when power is removed or in the event of a power failure. The manifold controller 52 is responsible for controlling the air pressure of the respectively connected air channels 46 having unique operating characteristics in response to the commands received from the display controller 40. Thus, the present invention migrates part of the intelligent control from the display controller 40 to the manifold controller 52.

The EPROM 118 store current operating desired pressures, respective speed value, system functions and parameters. The field programmability uses the display buttons and indicators to change the desired set point tire pressures and speeds for the respective terrain and load operating conditions, and to change operating functions and functions timers, and all other operating parameters. This programmability is particularly useful for testing of tire performance over various speeds, pressures, loads, terrains, vehicles, operating functions, and parameters. For example, the system can be field programmed to disable an over speed detection and to disable over speed increment for disabling the automatic adjustment of set tire pressures during continuous over speed operation. This could facilitates tire testing by a tire or vehicle manufacturer.

The microprocessor 86 may stored groups of operating values which represent the complete operational control of a system including desired pressures, respective speeds, functions, timers and parameters. Each group of values are field selectable and programmable using a front panel switches and button and processor addressing, scrolling and display programs. Each group of values may be assigned a vehicular model number so that one manufacture controller could be used on a wide variety of vehicles each having individual required operation values. Each group would define the number of manifold, gating means, air channels. This eliminates the number of controllers necessary to control different types of vehicles for manufacturing cost savings. Thus, a number of numbers field programmable selectable enabling one controller to be installed in many types of all terrain air pressurized vehicles.

The system uses voltage spike suppression of the EMI filter 130 to reduce the problem of voltage transients that might otherwise affect the pressurization adjustment cycles. The system does not work of an differential voltage directly for sensing the difference between the actual pressure voltage signal and voltage reference of the target pressure. In stead, the system uses program control functions which are inherently insensitive to voltage transients. The system averages actual pressure measurement for improve noise immunity and accuracy. The system senses the actual pressure a predetermined number of times, for example, sixteen times, and computes an average actual pressure value. The average of the actual pressure avoid voltage transient which may otherwise lead to false sensing of actual pressure and limits overshooting or undershooting to the target pressure. Also, the average actual pressure avoid minor fluctuation of tire pressures which may result during rotation of the tire on rough and bumpy surfaces. The voltage transient do not affect the operation of the system.

The system also uses tolerance pressure bands around the desired pressure to limit the number the adjustment cycles with improved pressure accuracy. The system initiates and inflation or deflation adjustment cycle if the actual measured pressure is outside a predetermined pressure band around a desired pressure. The system also employs dynamic offset values which are updated after pressurization adjustment cycle to dynamically fine tune the system to changing operating characteristics. The system also uses stabilization time periods to measure static pressures to further limit the number of required adjustment cycles and the potential hunting by undershooting and overshooting. The dynamic offset method with stabilization time periods have an absolute shut-off at the end of an inflation or deflation adjustment cycle to absolutely end each adjustment cycle.

During initial installation of the system, the offset values are preferably equal to zero, but may also to set to a initialization default values. There is an offset value for each set normal operating condition having a desired pressure, for example 45 PSI for highway and unloaded. There is an offset value for inflating and deflating to the desired pressure. During subsequent inflation and deflation cycles, and offsets values are updated and stored and used thereafter maintained in dynamic offset look up tables.

The dynamic offset method adjust desired pressure to target pressure. The average actual dynamic pressure value is compared to the target pressure during an inflation or deflation adjustment cycle. The actual pressure measured during an adjustment cycle is dynamic and changes over time. During and at the termination of an inflation or deflation adjustment cycle, the actual pressure reading is a dynamic pressure reading. The system terminates a current inflation or deflation air pressure adjustment cycle when the dynamic pressure equals the target pressure. The system then waits a stabilization time period. Each system has a unique inherent air pressure response settling time after the termination of an adjustment cycle. For example, shut off valve actuation may uniquely reduce the actual air pressure after termination of an inflation or deflation cycle. After the termination of an adjustment cycle and after the response stabilization time, the dynamic pressure reading becomes a static pressure reading which is then relatively stable. The system uses the target pressure and the static pressure to update the offset values so the static pressure will equal the desired pressure on the next adjustment cycle.

The updated offset values compensate for changing operating characteristics, such as those affected by temperature, tire wear and altitude. The offsets may be stored in two look tables, one for inflation and one for deflation, each having a series of offsets related to desired pressures, for example, a desired pressure set point of the highway and loaded operating condition. An offset in the two look tables is dynamically updated, if changed in value, after every inflation or deflation adjustment cycle. After the system measures a static pressure, it recomputes the offset value, and updates the stored offset value, if it had changed. In this manner, the offsets are dynamically updated over the operating life of the system.

In addition to the dynamic offsets, there is also a dynamic null offset which accounts for a measured pressured when sensing atmosphere. The actual measure pressure during adjustment cycles are adjusted by the null offset. Pressure measurement by pressure transducers 70 change with temperature, humidity and altitude. Any shift in the null pressure directly affects the accuracy of the pressure measurement. The transducer 70 is calibrated each time a vehicle is restarted by measuring the null offset. After the start of the system, controller 40 sends appropriate commands to the shut off valve 58 so that cavity is pressurized to atmosphere. The controller 52 then measures the output voltage of transducer 72 for sensing the atmospheric null pressure. The null pressure is measured at the start of each operation period so that it remains current with respect to various environmental factors such as temperature, humidity and altitude.

The display controller 40 determines current desires pressures and communicates them by command to the manifold controllers 52. The manifold controller 52 acts upon commands to pressurize the air channels to the desired pressure while maintaining the dynamic look up tables which may vary over time based upon dynamic operating conditions. Hence, there is a split in the intelligent processing responsibilities between the macro control of display controller and the micro control of the manifold controller. To initiate distributive control, the display controllers 40 communicates command strings to the manifold controllers 52 which responds with status information. While many different protocols could be used, in the preferred form of the invention, system uses a command string having an identification byte, a command byte and a value byte. The identification byte identifies the manifold and air channel to which the command applies. In the case of a single manifold controlling a plurality of air channels using the gate, the identification byte serves to identify one of the air channels. The command byte communicates one command of a command set which may comprise start, static, desired, update and run flat commands. The value byte communicates either a desired pressure or parameter value. The start command commands the identified manifold controller 52 to shut off the identified connected air channel 46, reset, execute self diagnostics, measure null pressure and present status. The start command value byte is not used. The static command commands an identified manifold controllers 52 to measure the static pressure of an identified air channel 46 and adjust the measured static pressure with the null pressure and present status. The static command value byte is not used. The desired command commands the identified manifold controller 52 to execute an inflation deflation adjustment cycle to adjust the tire pressure to an identified desired pressure of the identified air channel 46 and present status. The desired command value byte would have the desired pressure value. The update command commands the identified manifold to update a specific parameter for the identified air channel. The update command value byte would indicate the new parameter value. The run flat command commands the identified manifold to provide the identified air channel. The run flat value byte is not used.

To complete the distributive control, the manifold controller 52 responds to each command with requested status. While many status protocols could be used, in the preferred form, requested status could comprise the communication of a response string including an identification byte indicating the responding manifold and air channel, a status byte indicating status of the responding manifold and air channel, and a pressure byte having an air pressure value associated with the identified manifold, the identified air channel and presented status. The status byte could have Low Air, Flat, Off, Deflate, Inflate, Complete, Null and Error bits. The pressure byte could be the Null pressure in response to a Start command, a Static pressure in response to a Static or Desired command, and a flat pressure in response to Static, Desire or Run Flat command.

The distributive intelligence of the system is partitioned between the display controller 40 and the manifold controllers 52. The display controller 40 is primarily responsible for macro control, over speed detection, desired pressure selection, programmability, display panel control and operator interaction. The manifold controller is responsible for micro control, manifold air pressure control, pressure sensing, parameter storage, dynamic offset storage and tire air pressure adjustments. For simplicity in discussion, the control flow for both of the controller 40 and 52 are shown FIGS. 5a, 5b, 5c and 5d. The display controller executes most of the functions shown in FIGS. 5a, 5c and 5d while the manifold controller executes most of the functions shown in FIG. 5B including the run flat and pressure adjust routines.

The controllers 40 and 52 can be field programmed to change desired pressures, functions and parameters. For each operating condition, typically specified by a combined load and terrain selection, e.g. Half loaded on Highway, the display controller maintain a desired pressure, e.g. 45 PSI, respective speed limit. The display controller maintains in EPROM a table of desired pressures and speeds. The display controller also stores a set of functions and function values which are also stored. The functions and function values, in the preferred form of the invention, include five functions such as Power Up Timer function and Power Up value, Restart function and Restart Timer value, Over Speed Limit function and Over Speed Limit Timer value, Speed Increment function and Speed Increment Timer value, and Run Flat function and Run Flat Timer value.

The manifold controller 52 uses a set of manifold parameters for micro control of the air pressurization. The display controller 40 can communicate newly entered manifold parameters to manifold for field programmable updating of the manifold parameters. In the preferred form of the invention the parameters include a gross pressure band A and a fine pressure band B for each desired pressure, inflation offset value and deflation offset value for each desired pressure, a static delay time, a low air supply pressure value and a flat pressure value. While these few preferred manifold parameters are used in common to most system, system configurations and manifold means for controlling air pressure may give rise to differing sets of parameters. The low air pressure, flat tire pressure, pressure bands A, pressure band B, static delay time and dynamic offset values are preferably common to most systems and are further discussed herein in connection with FIGS. 5a, 5b, 5c and 5d.

In addition to these preferred common manifold parameters, other micro control parameters could be used depending on the type and configuration of the system. For example, when sensing static pressure or during an adjustment cycle in a wheel valve system when the wheel valves are shut off, the manifold could provide parameters indicating an inflation pulse time to open the wheel valves, and then wait an inflation delay time to then thereafter measure the air pressure to then again shut off the wheel valve or to continue inflation or deflation adjustment cycle. For another example, a parameter could specify a number inflation pulses that are used at the beginning of adjustment cycle to open the wheel valves. When sensing initial air pressure in a wheel valve system during a flat tire condition when the wheel valves are shut off, the manifold could use a parameter which indicates a flat tire inflation pulse time and then wait a flat inflation delay time to then thereafter measure the air pressure to then again shut off the wheel valve. When actuating the gate 74 having a port valve seal, not shown, the manifold could provide a parameter number of inflation pulses to ensure sealing the port valve. These micro control parameters are particular to a system within the scope of the present invention. Not all possible parameters are discussed in detailed. Significantly, the display controller 40 is used to update manifold parameters communicated to and stored within the manifold controller 52 for micro control of the air pressurization of the tires. The manifold 42 uses default parameters or updated parameters. The parameters can be updated through the display controller 40, such as the bands A and B, or can be updated by the manifold controller 52, such as the dynamic offset values. The parameters are updated of the control of pressure sensing and pressure adjustment cycles.

Figure 5A:
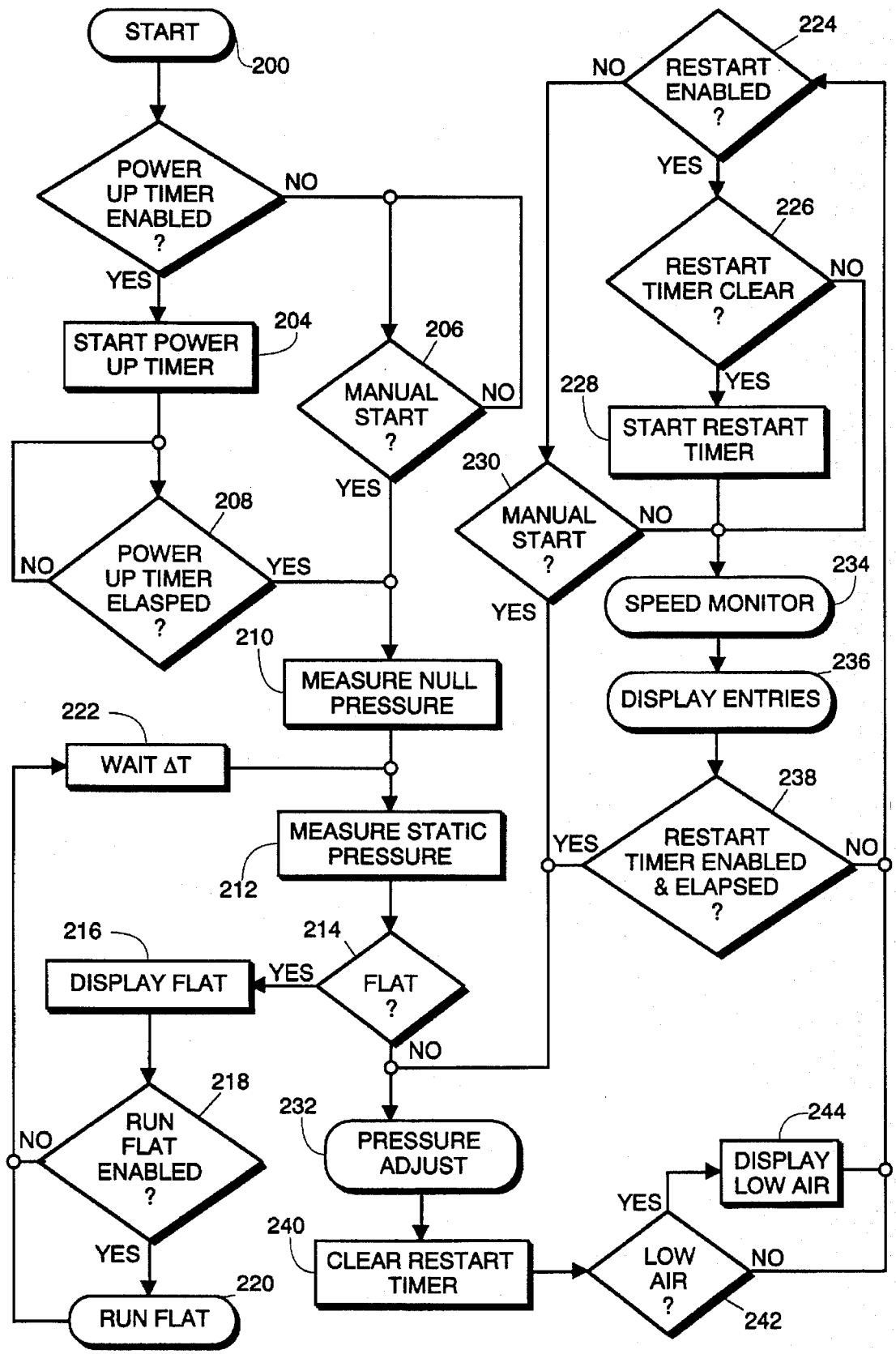
FIGS. 5A, 5B, 5c and 5d are flow chart diagram of the air pressurization system.

Referring to FIG. 5A, the display controller 40 start 200 upon ignition of the vehicle which supplies power to the system. If the power up timer function is enabled 202 the power up timer is started 204, if not the system waits 206 for a depression of the start button 13. If the power up timer has been started 204 the controller 40 waits 208 until the power up timer 204 has elapsed. The power up timer may be set in increments of one second from five to one hundred seconds. When either the power up timer has elapsed or the start button 13 has been depressed 206, the controller 40 measures the null pressure 210 by and then measures the static pressure 212. The start command is used to measure the null pressure and a static command is used to measure static pressure. The null command is directed to only a first manifold 42a whereas the static command is directed to all of the manifolds 42. If an air channel 46 is flat 214, the display panel 10 indicate a flat condition by having the low air LED 17 continuously on and may display 216 the flat tire pressure on the display 11a. If the fun flat function is enabled 218 then a run flat command is issued 220 for run flat inflation. In either case, when the run flat timer is elapsed 222 and the system again measures 212 the static pressure. The run flat function 220 is executed by the manifold controller 52 to provide the flat tires with a periodic inflation time to maintain some air inflow. In the case of a air channel or tire slow leak, the tires 50 may be inflated to near normal pressures for substantial periods of time so the vehicle could run flat until the flat tire condition can be repaired. The run flat operation 220 is initiated by a run flat command.

The controller uses the restart function to periodically check and maintain tire pressure to desired pressure. Very small air leaks or changing conditions such as wear and temperature can cause the air pressure to change resulting in a need to periodically check and maintain the tire pressure. The restart function is used to periodically check and adjust the tire pressure. If the restart function is enabled 224 and the restart timer has been cleared 226 indicating that a pressure adjustment cycle has recently completed, then the restart timer is started 228 which indicates the time between pressure adjustment cycles. The restart time is preferably set between three and one hundred minutes in one minute increments. If a manual start has been entered 230, a pressure adjustment cycle 232 process is executed. If a manual start has not been entered 230, then speed monitoring 234 and display entries 236 process are executed. If the restart timer has elapsed 238, then a pressure adjustment 232 is executed. The pressure adjustment 232 is initiated through a desired pressure command. If the restart timer has not elapsed then the restart enabled function is checked again 224. After a pressure adjustment cycle 232, the restart timer is cleared 240 and low air is checked 242. If a low air condition is present 242, a low air indication is displayed 244, if not, the restart enabled function is check again 224. Low air pressure is preferably eight-five PSI.

The system is started 200 by pressing the button 13. Process loops of the power up timer 208 and manual start 206 may have subroutine jumps to display entries routine 236. During the loops 208 and 206, the signal LED 21, 23, 25 or 27, corresponding to the current operating condition will light up and blink during the power up timer 208 or until a manual start 206. During the power up timer 204 or manual start loop 206, the button 20, 22, 24 and 26 may be pressed to commence an initial pressure adjustment 232 after the power up timer 206 or manual start depression 208 resulting in pressure adjustment 232 of tire pressure by the operator.

Figure 5B:
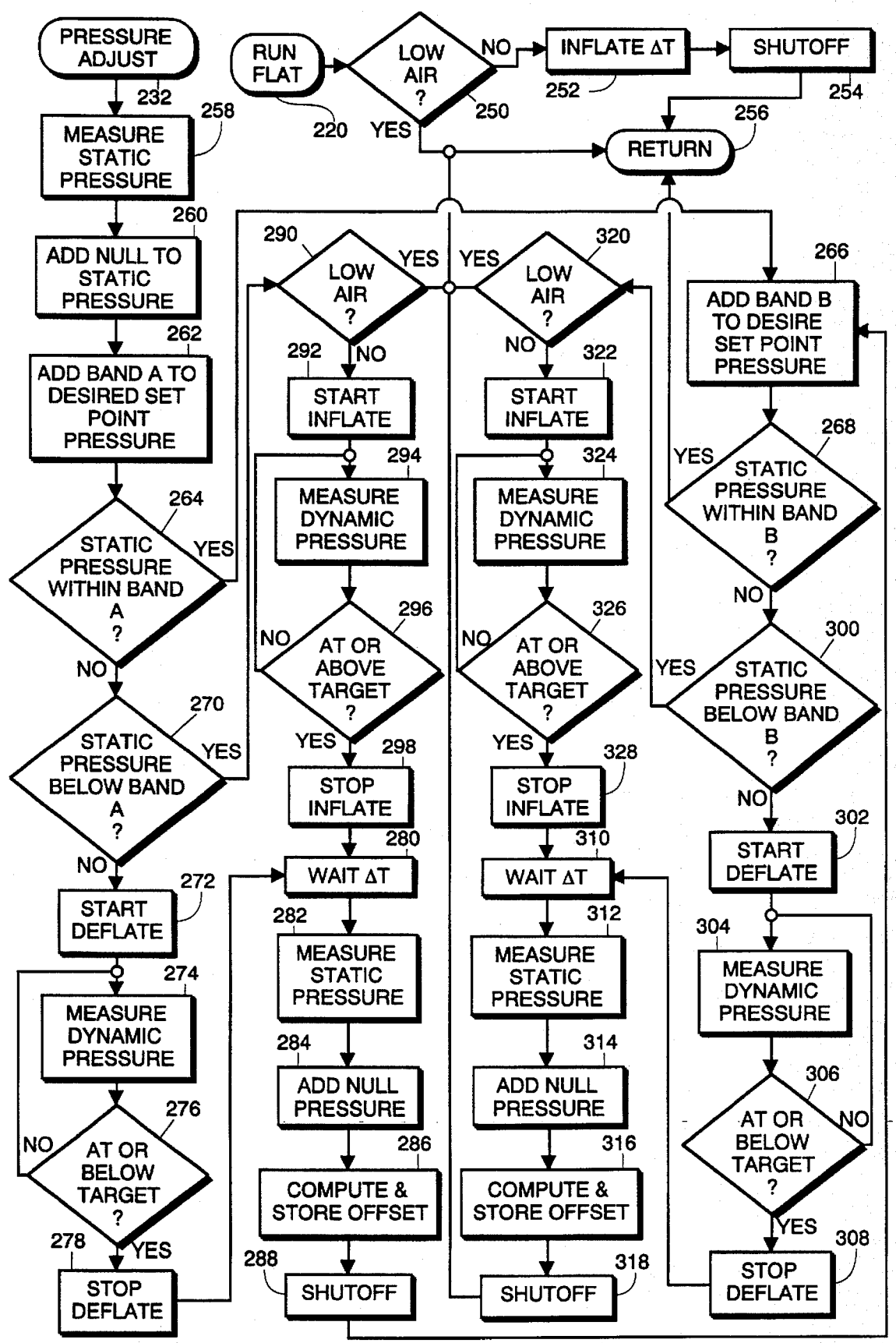

Referring to FIG. 5B, the run flat process 220 and is used to provide an air flow into a leaking air channel or flat tire during a run flat condition enabled by the run flat function. Upon initiation of the run flat process 220, a low air condition is determined 250. If the supply air source is not low, then the inflation valve is opened 252 to supply air into the identified air channel for a run flat time of the stored ran flat time parameter. After the inflation time 252, the shut off valve is opened 254 to closed the air channel 46 in the wheel valve system. After the shut off 254, the run flat process returns 256. If a low air condition is determined 250, the process returns 256 without inflation 252 in order to conserve the air supply.

During the pressure adjustment cycle 232, the desired pressure is adjusted by offsets, which are subtracted in the case of deflation and added in the case of inflation resulting in the target pressure. As the tire pressure is being increased or decreased, the sensed changing air pressure is a dynamic pressure value. After an inflation or deflation adjustment at a closed loop point when the dynamic pressure equals the target pressure and after a stabilization period, the air pressure is stabilized and considered a static pressure. The difference between the target pressure and the static pressure is the new offset value which replaces the old offset value.

When a pressure adjustment cycle is initiated 232, the static pressure is measured 258 and adjusted with the null pressure 260. The gross band A is added 262 to the desired pressure to provide an acceptable band of pressure. The static pressure is compared 264 to the pressure band A, that is, if the static pressure is within a band of pressure above or below the desired pressure. The band A and band B are preferably between 0.5 PSI and 8.0 PSI in 0.5 PSI increments. If the static pressure is within the band A centered about the desired pressure, that is the desired pressure band, then the fine pressure band B is added 266 to the desired pressure. If the static pressure is within the fine band B 268, then the pressure adjustment cycle is terminated at return 256. Thus, if the static pressure is within both band A 264 and band B or the desired pressure, then no air pressure adjustment is preformed.

If the static pressure is not within desired pressure band A 264, then it is determined 270 if the static pressure is below desired pressure band A. If the static pressure is not below desired pressure band A, then deflation is initiated 272. The dynamic pressure is periodically measured 274 to determine 276 when the dynamic pressure reaches the target pressure. The target pressure during deflation is the desired pressure minus a deflation dynamic offset value. When the dynamic pressure reaches the target pressure 276, deflation is terminated 278 followed a wait time period 280 to stabilize the air pressure within the tires and air channel. The stabilization time allows equalization of the pressure among the tires connected to an air channel. Equalization may take a few seconds. After the stabilization time period 280, the static pressure is measured 282 and null adjusted 284. A new dynamic deflation offset value is computed and stored 286, and, in the case of wheel valve system, the wheel valves are shut off 288. The flow then continues to add band B 266 to the desired pressure and determined if the static pressure is within desired pressure band B 268.

If the static pressure is below desired pressure band A, low air is check 290 prior to initiating inflation 292. If low air is sensed 290 the process returns 256 without inflation 292 to conserve the air supply. During inflation 292, the dynamic pressure is periodically measured 294 to determine 296 when the dynamic pressure reaches the target pressure. The target pressure during inflation is the desired pressure plus a dynamic inflation offset value. When the dynamic pressure reach the target pressure 296, inflation is terminated 298 followed by the wait time period 280 to stabilize the air pressure within the tires and air channel. As with deflation, after the stabilization time period 280, the static pressure is measured 282 and null adjusted 284. A new dynamic inflation offset value is computed and stored 286, and, in the case of wheel valve system, the wheel valves are shut off 288. The flow then continues to add band B 266 to the desired pressure and determined if the static pressure is within desired pressure band B 268.

If the static pressure is not within the desired pressure band B 268, then it is determined 300 if the static pressure is below desired pressure band B. If the static pressure is not below desired pressure band B, then deflation is initiated 302. The dynamic pressure is periodically measured 304 to determine 306 when the dynamic pressure reached the a target pressure. The target pressure during deflation is again the desired pressure minus a dynamic deflation offset value. When the dynamic pressure reaches the target pressure 306, deflation is terminated 308 followed a wait time period 310 to stabilize the air pressure within the tires and air channel. After the stabilization time period 310, the static pressure is measured 312 and null adjusted 314. A new dynamic deflation offset value is computed and stored 316, and, in the case of wheel valve system, the wheel valves are shut off 318, and the pressure adjustment cycle terminates by return 256.

If the static pressure is below the desired pressure band B, low air is check 320 prior to initiating inflation 322. If low air is sensed 320 the process returns 256 without inflation 292 to conserve the air supply. During inflation 322, the dynamic pressure is periodically measured 324 to determine 326 when the dynamic pressure reaches the target pressure. The target pressure during inflation is the desired pressure plus a dynamic inflation offset value. When the dynamic pressure reach the target pressure 326, inflation is terminated 328 followed by the wait time period 310 to stabilize the air pressure within the tires and air channel. As with deflation, after the stabilization time period 310, the static pressure is measured 312 and null adjusted 314. A new dynamic inflation offset value is computed and stored 316, and, in the case of wheel valve system, the wheels valves are shut off 318, and the pressure adjustment cycle terminates by return 256.

The selected LED 21, 23, 25 or 27 corresponding to current operating condition may be blinked during a pressure adjustment 274, 294, 324 and 304. The selected LED may continue to blink until the current pressure adjustment has been completed at return 256. The selected LED then remains lit after the shut off to provide a reference for the last completed pressure adjustment cycle.

The above pressure adjustment cycle is characterized by a gross pressure adjustment using band A, a fine pressure adjustment using band B, a null adjusted static pressure, an absolute shut off when the dynamic pressure equals a target pressure, a target pressure equal to a desired pressure adjusted by an offset value, a wait period for air pressure stabilization prior to measuring the static pressure after inflation or deflation, and an updated dynamic offset value recomputed after each inflation or deflation. The system updates the dynamic offset values after the stabilization time period to account for settling times and to continually update to the dynamic offset values to account for dynamic changes of the system.

In the preferred form, for each desired pressure, for each air channel, there is an inflation and deflation dynamic offset value. In an alternate form of the invention, there is an offset value for each band A and band B. In the preferred form, there is one stabilization time period. In an alternate form of the invention, there is a wait time period for inflation or deflation, for each band A and band B, and for each air channel. The stabilization period is preferably between 0.5 and 8.0 second set in 0.5 second increments. The desired pressures are set between five PSI and sixty PSI in one PSI increments, increments for each operating condition, load level condition and air channel.

Figure 5C:
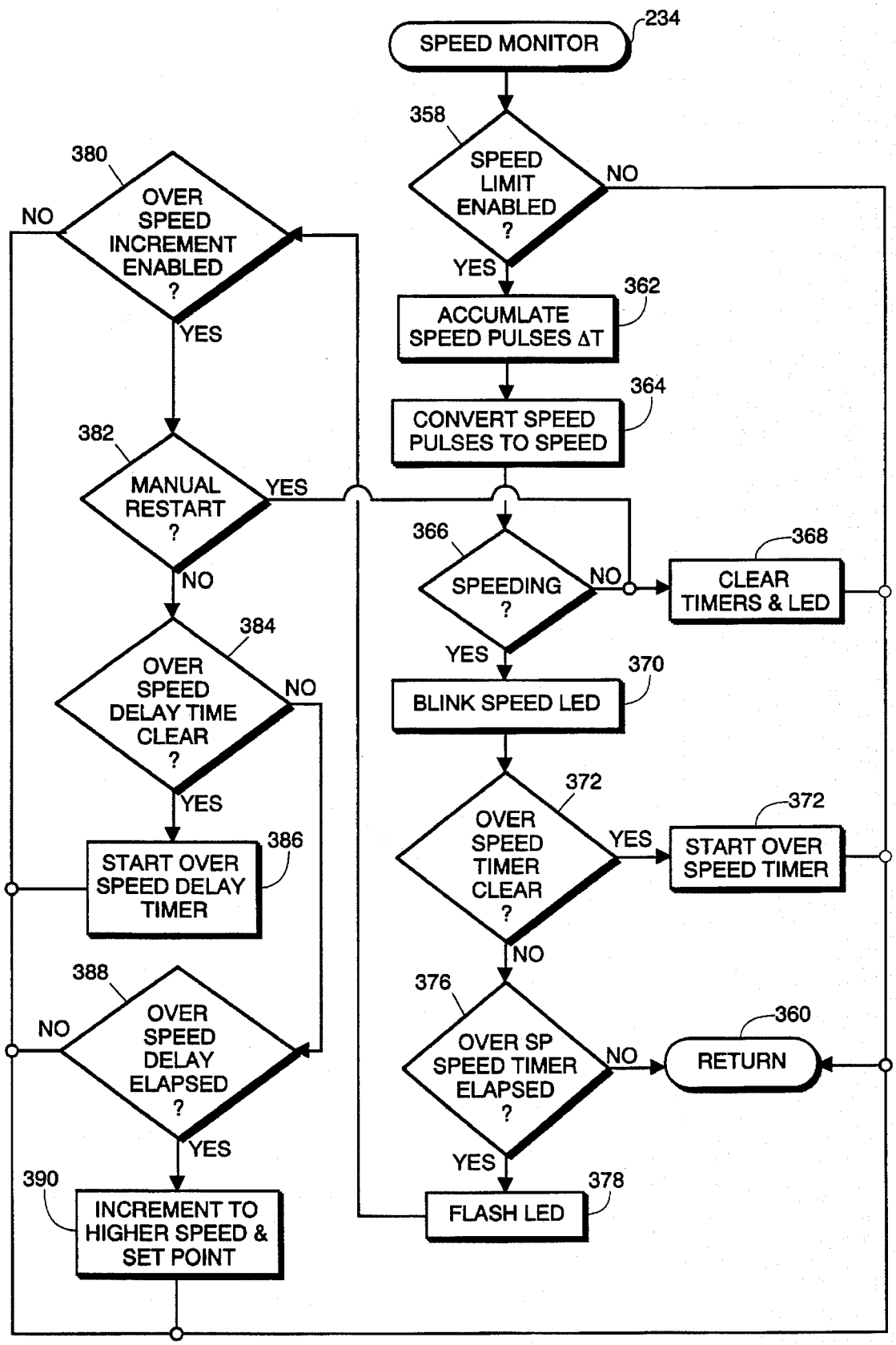

Referring to FIG. 5c, the speed monitoring process 234 first determines if the speed limit function is enabled 358. If not, the speed monitoring process returns 360, otherwise the speed pulses from a vehicular speed transducer, not shown, are accumulated 362 for an speed pulse accumulation time which is preferably two seconds, but which may be one to sixty seconds in one second increments. The accumulated pulses are converted 364 to speed by a pulse to MPH conversion multiplier which is typically seven but could vary depending upon the type of speed transducer used. After the speed is determined 364, the speed is compared 366 to the current speed limit. Preferably, each desired pressure has a respective speed limit. The speed limits may be set between five MPH and seventy MPH in one MPH increments. Preferably there is a speed limit and respective desired pressure for each operating conditions.

The over speed limit process uses two timers, an over speed limit timer and an over speed increment delay timer, and controls the over speed LED 12c. If the vehicle is not speeding 366, the timers and LED are cleared 368 indicating a safe operating speed. If the vehicle is speeding 366, the speed LED is blinked 370 to indicate to the operator that an over speed limit condition exists. The operator can reduce vehicular speed to clear 368 the over speed condition. The over speed timer is used to determine if an over speed condition has existed for an over speed limit time period. The over speed time period can be one to sixty second in one second increments, preferably set at five seconds. It is first determined 372 if the over speed limit timer has been cleared 368, and if so then the over speed limit timer is started 374 followed by a return 360. If the over speed limit timer has not been cleared, and the over speed timer had already been started 374, then it is determined 376 if the over speed limit timer has elapsed, and if not then a return 360. If the over speed limit timer has elapsed 376, the over speed limit LED is flashed 378, that is blinked for an extended duration, to indicate to the operator that the vehicle has been exceeding the speed limit for more that the over speed limit timer, and that an increase in speed limit and corresponding increase in the desired pressure may occur after the over speed increment delay time. The over speed increment delay time can be one to sixty seconds in one second increments, preferably set at forty-five seconds.

The speed monitoring process then determines 380 if the over speed increment function is enabled. If not, the process returns 360, and if so, the process then determines 382 if a manual restart has been entered by the operator. If a manual restart has been entered 382 by pressing the on button 13, the timers and over speed LED of the speed monitoring process are cleared, effectively resetting the over speed monitoring process. The manual restart enables an operator to manually bypass an automatic increment of the speed limit and change of the desired pressure even when the automatic increment function is enabled and the operator continues to exceed the current speed limit. If the manual restart has not been entered 382, then it is determined 384 if the over speed delay timer has been cleared, and if so, then the over speed increment delay timer is started 386. If not, then it is determined 388 if the over speed delay timer as elapsed. If not, the process returns 360. If the over speed timer has elapsed, then the desired pressure is increased 390 resulting in an increased speed limit. The over speed delay timer in the over speed increment function is used to automatically increment the speed limit by increasing the respective desired pressure due to operating the vehicle in an over speed condition for an extended period of time. During the next pressure adjustment cycle, the tire pressure will be increased to the new desired pressure resulting in a new increase speed limit. In this manner, tires are operated at the correct pressure for the current vehicular speed. The speed monitor process 234 monitors only speed, but could modified to also monitor load levels which could be used to adjust the current speed limit.

Figure 5D:
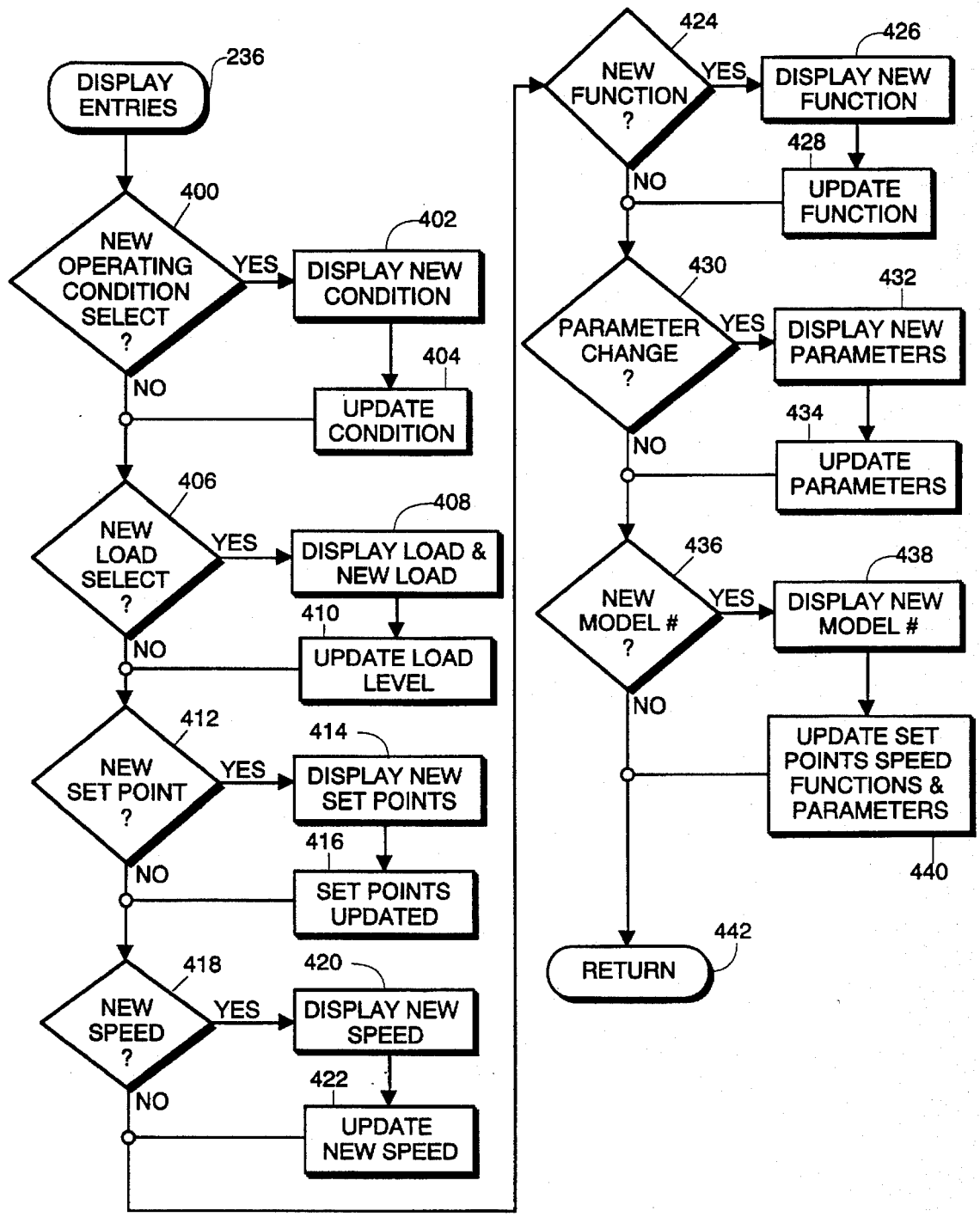

Referring to FIG. 5d, the display entries process 236 is used to process the selection of a new operation condition, e.g. Highway, new load level conditions, e.g. full, new function, e.g. restart, and new parameters, e.g. pressure band A. The process determines 400 if a new operating condition has been selected. This could be by way of operator selection or by automatic control, for example, during an over speed limit condition. If a new operating condition has been selected, it may be displayed 402 for operator convenience. The display controller memory is also updated 404 with the new condition. Then, the process determines 404 if a new load level condition has been selected, and if so, it may be displayed 406 for operator convenience. The display controller memory is also updated 410 with the new load level operating condition. If a new desired pressure has been selected or entered 412 by either operator selection of a new operating condition, by operator entry of a new load level condition, or by automatic control, the new desired pressure is displayed 414. The display controller memory is updated 416 to the desired pressure. During the next pressure adjustment cycle, the tire pressure will be adjusted with the new desired pressure for the current operating condition and load level condition.

It is determined 418 if a new speed values has been entered 418. If so, the new speed value is displayed 420 and stored in the display controller memory. It is determined 424 if a new function has been enabled or disabled by operator entry. If so, the new function is displayed 426. The display controller memory is updated 428 with the new state of the function. During the next use of such function in its new enabled or disabled state, that change will be used. It is determined 430 if a parameter has been changed 424 by operator entry. If so, the new parameter is displayed 432. The new parameter is stored either in the display controller memory or the manifold memory, The parameters include desired pressure, speed limits, function timers and over speed timers all stored in the display controller memory and include offsets, pressure bands, run flat inflation time, low air pressure and flat tire pressure stored in the manifold controller memory. An update command is used to update parameters that are stored in the manifold controller memory. It is determined 436 is a new vehicular model number has been entered. If so, the model number is displayed 438. The new model number is referenced to data stored in reserve areas of memory. The data may include a new set of desires pressures, new speed limits, new functions, new function timers and new parameters which are stored in the memory of the controller and manifold as current values. After updating the new conditions, desired pressures, speed limits, functions, and parameters, the process returns 442.

Referring to FIG. 1a and 5d, operator selection and entry of new conditions, desired pressures, speed limits, functions, parameters and models are perfected by used of the panel 10.

Even though the panel 10a for example has a limited number of button 13, 14, 16, 18, 20, 22, 24, 26, sequences of depressions of the button can be used to change the conditions, desired pressures, speed limits, functions, parameters and models. For example, depressing the channel select button 18 could cycle through a display of channel 1 tire pressure indicate by led 19a and 12a, then channel 1 desired pressure indicated LED 19a and 12b, then channel 1 speed limit indicated by 19a and 12c, then channel 2 tire pressure indicated by LEDs 19b, 19c and 12a, and so on through all of the channels. As example, to increase the desired pressure of channel 1 when LEDs 19a and 12b are on, and the desired pressure is displayed, a simultaneous depression of the channel select button 18 and the On button 13 would increase the desired pressure, and a simultaneous depression of the channel select button 18 and the off button 14 would increase the desired pressure. Using a combination of button depressions, condition, functions and parameters and be selected or entered. The system can store blocks of functions and parameters data for each of a plurality of vehicle models. By way of example, simultaneously pressing the buttons 16 and 18 could cause a display of the vehicle model number, with the on and off buttons 13 and 14 used to scroll through a list of model numbers. When one is selected, all of the store function states and parameters values are load into a current operating state of the system. Thus one controller could be used on a variety of vehicles without the need to reprogrammed, excepting the initial selection from the list of model numbers. The above preferred embodiments may be enhanced or modified by those of skilled in the art. Those enhancements or modifications may nonetheless fall within the spirit and scope of the following claims.

What is claimed is:

1. A system in a vehicle for adjusting respective tire air pressures in respective sets of tires using an air supply, said system comprising, a controller means comprising a memory means for storing programs, processor means for executing said programs, and a communication means for transmitting respective commands communicating sets of respective desired pressures, said controller means for selecting one of a plurality of operating conditions referenced to one of said sets of respective desired pressures and for generating said respective commands communicating respective desired pressures for said respective sets of tires, a plurality of respective manifold means comprising respective manifold controller means each of which comprising respective manifold memory means for storing respective manifold programs, respective manifold processor means for executing said respective manifold programs, respective manifold communication means for receiving said respective commands, said respective manifold controller means for monitoring said respective tire air pressures in said respective sets of tires, said respective manifold controller means for respectively responding to said respective commands for adjusting said respective tire air pressures to said respective desired pressures, said plurality of respective manifold means further comprises respective inflation means for supplying respective supply air from said air supply to said respective sets of tires, respective deflation means for exhausting respective exhaust air from said respective sets of tires, and respective air pressure sensors for sensing said respective tire air pressures in said respective sets of tires, said respective commands identifying said respective manifold means independently responding and adjusting said respective tire air pressures to said respective desired pressures in said respective sets of tires, and a plurality of respective air channel means respectively connected between said respective inflation means, said respective deflation means, and said respective set of tires for communicating said respective supply air to said respective sets of tires, for communicating said respective exhaust air from said respective sets of tires, and for communicating said respective tire air pressures from said respective sets of tires to said respective air pressure sensor.

2. The system of claim 3 wherein said controller means further comprises a panel means for selecting and displaying one of said plurality of operating conditions for selecting said respective desired pressures for said respective sets of tires.

3. The system of claim 1 wherein said respective commands identify said respective air channel means, said plurality of respective manifold means is one manifold, said system further comprising, a gating means for communicating said respective supply air and said respective exhaust air between said one gating manifold and said respective air channel means, said gating means connected to and controlled by said respective manifold controller means for routing one at a time said respective air channel means to said one gating manifold.

4. The system of claim 1 wherein said plurality of respective manifold means each further comprises respective shut off means controlled by said respective manifold controller means for evacuating said respective tire air pressure from said respective air channel means, said system further comprises, respective wheel valve means each respectively connected between said respective air channel means and said respective sets of tires, said respective wheel valve means for communicating said respective supply air to said respective sets of tires during inflation, for communicating said respective exhaust air from said respective sets of tires during deflation, and for shutting off air communication to and from said respective sets of tires when said respective air channel means is evacuated.

5. The system of claim 1 wherein one of said respective manifold means comprises a select valve means connected to said respective air pressure sensor, said respective air channel means, and to atmosphere, said select valve means controlled by said respective manifold controller means, said select valve means for communicating atmosphere to said respective air pressure sensor for sensing atmospheric null pressure or for communicating said respective tire air pressure in said respective air channel means to said respective air pressure sensor for sensing said respective tire air pressures.

6. The system of claim 1 wherein said controller means further comprises, speed detection means connected to said vehicle and to said processor means for sensing vehicular speed, and panel means for selecting and displaying said one of said plurality of operating conditions, said plurality of operating conditions are referenced to speed ranges, said processor means for determining when said vehicular speed is within one of said speed ranges referenced to said one of said plurality of operating conditions.

7. The system of claim 1 wherein said respective manifold memory means comprises non volatile memory for storing respective parameter values comprising respective offset values used by said respective manifold processor means to adjust said respective desired pressures, said respective desired pressures and said offset values provide respective target pressures, said respective manifold processor means is for controlling said respective inflation means and said respective deflation means for adjusting said respective tire air pressures until said respective tire air pressures reach said respective target pressures sensed by said respective air pressure sensors, said respective manifold processor means is for waiting predetermined respective static time periods for sensing respective static air pressures by said respective air pressure sensors and for recomputing and storing said respective offset values equal to the difference of said respective target pressures and said respective static air pressures.

8. The system of claim 1 wherein said respective manifold memory means comprises rewritable non volatile memory for storing respective parameter values, said controller means further comprises, a panel means for entering said respective parameter values communicated to said respective manifold controller means for controlling the operation of said respective inflation means and said respective deflation means for adjusting said respective tire air pressures to said respective desired pressures.

9. The system of claim 1 wherein said memory means comprises rewritable non volatile memory for storing entered data, said controller means further comprises, a panel means for entering said entered data stored in said non volatile memory, said entered data is received by said processor means for communicating said respective desired pressures to said respective manifold controller means for maintaining said respective sets of tires at said respective desired pressures.

10. The system of claim 9 wherein said sets of respective desired pressures are organized as groups of sets of respective desired pressures, said controller means comprises a speed detection means connected to said vehicle and wherein said entered data comprises, control data comprising over speed detection data for detecting over speed conditions to automatically adjust said tire air pressures, automatic power up start data for automatically starting pressure adjustments of said tire air pressures after starting said vehicle, and automatic pressure adjustment restart data for automatically periodically readjusting said tire air pressures, model numbers each of which referenced to and for selecting one of said groups of said sets of respective desired pressures, low air value for determining when said air supply is low and to disable all of said respective inflation means to conserve said air supply, and flat tire value for determining when any one of said respective sets of tires is flat.

11. A method for adjusting respective tire pressures of respective sets of tires in a vehicle having an air supply communicated through respective air channels and respective manifolds controlled by a selecting controller, said method comprising the steps of, storing in said selecting controller sets of respective desired pressures respectively referenced to operating conditions and to said respective sets of tires, receiving select data referenced to one of said operating conditions to select one of said sets of respective desired pressures, transmitting respective commands communicating said respective desired pressures from said selecting controller respectively to said respective manifolds, said one set of respective desired pressures referenced to one of said operating conditions, said respective desired pressures referenced to said respective sets of tires, sensing in said respective manifolds respective static pressures of said respective tire air pressures in said respective air channels, determining in said respective manifolds if said respective static pressures are above or below said respective desired pressures, inflating in said respective manifolds said respective tire air pressures to said respective desired pressures when said respective static pressures are below said respective desired pressures, and deflating in said respective manifolds said respective tire air pressures to said respective desired pressures when said respective static pressures are above said respective desired pressures.

12. The method of claim 11 further comprising the steps of, storing in said selecting controller groups of said sets of respective desired pressures respectively referenced to vehicular model numbers and said operating conditions and said respective sets of tires, and receiving vehicular model number data to select one of said vehicular model numbers to select one of said groups of said sets of respective desired pressures.

13. The method of claim 11 further comprising the steps of, storing in said respective manifolds respective offset values, computing respective target pressures by combining said respective offset values with said desired pressures, sensing respective dynamic pressures during said inflating step, sensing respective dynamic pressures during said deflating step, terminating said inflation step when said respective dynamic pressures equal said respective target pressures, terminating said deflation step when said respective dynamic pressures equal said respective target pressures, waiting respective stabilization time periods after each of said inflating step and deflating step, sensing said respective static air pressures, and determining said respective offset values equal to said respective static pressures minus said respective target pressures.

14. The method of claim 11 further comprising the steps of, storing respective pressure bands in said respective manifolds, adding said respective pressure bands to said respective desired pressures resulting in respective desired pressure bands, determining during said determining step if said respective static pressures are within said respective desired pressure bands, inflating during said inflating step said respective tire air pressures to said respective desired pressures when said respective static pressures are below said desired pressure bands, and deflating during said deflating step said respective tire air pressures to said respective desired pressures when said respective static pressures are above said respective desired pressure bands.

15. The method of claim 11 further comprising the steps of, storing in said respective manifolds respective deflation offsets and respective inflation offsets for said respective desired pressures, storing respective pressure bands in said respective manifolds, sensing respective atmospheric null pressures, adjusting said respective static pressures by said respective atmospheric null pressures, adding said respective pressure bands to said respective desired pressures resulting in respective desired pressure bands, determining during said determining step if said respective static pressures are within said respective desired pressure bands, computing respective target pressures by adding said respective inflation offsets to said respective desired pressures when said respective static pressures are below said respective desired pressure bands, computing respective target pressures by subtracting said respective deflation offsets from said respective desired pressures when said respective static pressures are above said respective desired pressure bands, sensing respective dynamic pressures during said inflating step, sensing respective dynamic pressures during said deflating step, inflating during said inflating step said respective tire air pressures to said respective target pressures when said respective static pressures are below said respective desired pressure bands, deflating during said deflating step said respective tire air pressures to said respective target pressure when said static pressures are above said respective desired pressure bands, terminating said inflating step when said respective dynamic pressures equal said respective target pressures, terminating said deflating step when said respective dynamic pressures equal said respective target pressures, waiting respective stabilization time periods, sensing said respective static pressures, and adjusting said respective static pressures with said respective atmospheric null pressures, computing and storing in said respective manifolds said respective inflation offsets equal to said respective static pressures minus said respective target pressures, and computing and storing in said respective manifolds said respective deflation offsets equal to said respective static pressures minus said target pressure.

16. The method of claim 11 further comprising the steps of, storing a restart time period in said selecting controller, waiting said restart time period before said transmitting step, and repetitively executing said waiting step and said transmitting step.

17. The method of claim 11 further comprising the steps of, storing in said selecting controller speed ranges respectively referenced to said operating conditions, storing an over speed delay time period in said controller, referencing said one of said operating conditions to one of said speed ranges to select a speed range, sensing vehicular speed, determining if said vehicular speed is within said speed range, waiting said over speed delay time period when said vehicular speed is not within said speed range, rereferencing said operating condition to another one of said operating conditions after said over speed delay time period when said vehicular speed is not within said speed range, and communicating to said respective manifolds another one of said sets of respective desired pressures referenced to said another one of said operating conditions.

* * * * *